(12) United States Patent
Yang et al.

(10) Patent No.: US 10,270,562 B2
(45) Date of Patent: Apr. 23, 2019

(54) CONTROL TRANSMISSION SOFT COMBINING

(71) Applicant: QUALCOMM Incorporated, San Diego, CA (US)

(72) Inventors: Yang Yang, San Diego, CA (US); Jamie Menjay Lin, San Diego, CA (US); Jing Jiang, San Diego, CA (US); Gabi Sarkis, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 72 days.

(21) Appl. No.: 15/457,839

(22) Filed: Mar. 13, 2017

(65) Prior Publication Data
US 2018/0062797 A1 Mar. 1, 2018

Related U.S. Application Data

(60) Provisional application No. 62/382,093, filed on Aug. 31, 2016.

(51) Int. Cl.
H04L 1/18 (2006.01)
H04B 17/336 (2015.01)
H04Q 1/50 (2006.01)
H04W 28/14 (2009.01)
H04W 72/06 (2009.01)
(Continued)

(52) U.S. Cl.
CPC ......... *H04L 1/1845* (2013.01); *H04B 17/336* (2015.01); *H04L 1/007* (2013.01); *H04Q 1/50* (2013.01); *H04W 28/14* (2013.01); *H04W 72/06* (2013.01); *H04L 1/0038* (2013.01); *H04L 1/0061* (2013.01); *H04L 1/0072* (2013.01); *H04L 1/1819* (2013.01); *H04L 5/0053* (2013.01); *H04Q 2213/13215* (2013.01); *H04W 72/0446* (2013.01)

(58) Field of Classification Search
None
See application file for complete search history.

(56) References Cited

U.S. PATENT DOCUMENTS

2012/0300699 A1* 11/2012 Kamuf ................. H04L 1/1845
370/328
2014/0185534 A1* 7/2014 Vos ...................... H04W 72/042
370/329

FOREIGN PATENT DOCUMENTS

EP 2280505 A1 2/2011
EP 2566092 A1 3/2013

OTHER PUBLICATIONS

ISA/EP, International Search Report and Written Opinion of the International Searching Authority, Int'l Application No. PCT/US2017/047652, dated Nov. 28, 2017, European Patent Office, Rijswijk, NL, 13 pgs.

* cited by examiner

*Primary Examiner* — Saumit Shah
(74) *Attorney, Agent, or Firm* — Holland & Hart LLP

(57) ABSTRACT

Techniques are described for wireless communication. One method of wireless communication includes buffering a first set of coded bits including a first control message having a plurality of fields, buffering a second set of coded bits including a second control message having the plurality of fields, soft combining at least a first subset of the first set of coded bits and a second subset of the second set of coded bits in a combined set of coded bits, and decoding the first control message or the second control message based at least in part on the combined set of coded bits.

26 Claims, 18 Drawing Sheets

(51) Int. Cl.
*H04L 1/00* (2006.01)
*H04W 72/04* (2009.01)
*H04L 5/00* (2006.01)

CONTROL TRANSMISSION SOFT COMBINING

CROSS REFERENCES

The present Application for Patent claims priority to U.S. Provisional Patent Application No. 62/382,093 by Yang, et al., entitled "Control Transmission Soft Combining," filed Aug. 31, 2016, assigned to the assignee hereof, and hereby expressly incorporated by reference herein in its entirety.

INTRODUCTION

The present disclosure, for example, relates to wireless communication systems, and more particularly to techniques for soft combining control transmissions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation or 5G network, a network access device may take the form of a smart radio head (or radio head (RH)) or access node controller (ANC), with a set of smart radio heads in communication with an ANC defining a gNodeB (gNB) or an eNB. A base station or smart radio head may communicate with a set of UEs on downlink channels (e.g., for transmissions from a base station or smart radio head to a UE) and uplink channels (e.g., for transmissions from a UE to a base station or smart radio head).

In some examples, data may not be received or properly decoded by a receiving device (e.g., a UE or network access device). Upon determining that data was not received or properly decoded by the receiving device (e.g., via a hybrid automatic repeat request (HARQ) non-acknowledgement (NACK)), the device that transmitted the data (e.g., a transmitting device, such as a network access device or UE) may retransmit the data, or a redundant version thereof, to the receiving device. In some cases, the receiving device may buffer two or more transmissions, retransmissions, and/or redundancy versions of the data, and soft combine the transmissions, retransmissions, and/or redundancy versions to generate a combined transmission with an improved signal-to-noise ratio (SNR). The improved SNR of the combined transmission may make the combined transmission easier to decode.

SUMMARY

In one example, a method of wireless communication at a receiving device is described. The method may include buffering a first set of coded bits including a first control message having a plurality of fields, buffering a second set of coded bits including a second control message having the plurality of fields, soft combining at least a first subset of the first set of coded bits and a second subset of the second set of coded bits in a combined set of coded bits, and decoding the first control message or the second control message based at least in part on the combined set of coded bits.

In some examples, the method may include identifying, within the plurality of fields, at least one field having a set of bits that change deterministically from the first control message to the second control message. The method may also include deriving, from the set of bits that change deterministically from the first control message to the second control message, a subset of coded bits that differ between the first set of coded bits and the second set of coded bits; and modifying the subset of coded bits in at least one of the first set of coded bits or the second set of coded bits, to place the subset of coded bits in a same state in the first set of coded bits and the second set of coded bits.

In some examples, the method may include generating sequential ranks of the first set of coded bits and the second set of coded bits. Each rank of coded bits may be generated based on a different subset of information bits in the first control message or the second control message, and each lower rank of coded bits may be generated based on a subset of the information bits used to generate a next higher rank of coded bits. In these examples, the soft combining may be performed for the sequential ranks beginning with a lowest rank. In some examples, the method may further include refraining from soft combining a subset of the sequential ranks including at least one sequentially highest rank. In some examples, the method may further include identifying, within the plurality of fields, at least one field having a set of bits that change non-deterministically from the first control message to the second control message, and the refraining may be based at least in part on the identifying. In some examples, the method may further include identifying, within the plurality of fields, at least one field having a set of bits that change deterministically from the first control message to the second control message; deriving, from the set of bits that change deterministically from the first control message to the second control message, a subset of coded bits that differ between the first set of coded bits and the second set of coded bits; and modifying the subset of coded bits in at least one of the first set of coded bits or the second set of coded bits to place the subset of coded bits in a same state in the first set of coded bits and the second set of coded bits.

In some examples, the method may include buffering a search space of a control region transmitted during a first slot, in which buffering the search space includes buffering the first set of coded bits. In some examples, the first set of coded bits may correspond to a first set of log likelihood ratios (LLRs) (i.e., the first set of LLRs and the first set of coded bits may correspond to each other). In some examples, the method may include identifying a first resource allocation associated with the second set of coded bits, and identifying a second resource allocation associated with the first set of coded bits based at least in part on the first resource allocation associated with the second set of coded bits. In some examples, identifying a first resource allocation may include identifying a location of the control message in the search space (e.g., with respect to the location of the control message in the search space). In some examples, the soft combining may be based at least in part on identifying the first resource allocation, identifying the second resource allocation, or both. In some examples, the method may include identifying a first resource allocation associated with the first set of coded bits, and identifying a second resource allocation associated with the second set of coded bits based at least in part on the first resource allocation associated with the first set of coded bits. In some examples, the soft combining may be based at least in part on at least one of identifying the first resource allocation and identifying the second resource allocation.

In some examples, the method may include identifying a set of bits that differ between the first control message and the second control message; deriving, from the set of bits that differ between the first control message and the second control message, a number of cyclic redundancy check (CRC) bits that differ for the first control message and the second control message; identifying, based at least in part on the number of CRC bits that differ for the first control message and the second control message, a subset of coded bits that differ between the first set of coded bits and the second set of coded bits; and modifying the subset of coded bits in at least one of the first set of coded bits or the second set of coded bits, to place the subset of coded bits in a same state in the first set of coded bits and the second set of coded bits.

In some examples of the method, the first set of coded bits may correspond to a first set of LLRs and the second set of coded bits may correspond to a second set of LLRs. In some examples, the first set of coded bits and the second set of coded bits may be encoded based at least in part on a convolutional coding of information bits. In some examples, the first set of coded bits and the second set of coded bits may be encoded based at least in part on a polar coding of information bits.

In one example, another apparatus for wireless communication at a receiving device is described. The apparatus may include a processor, memory in electronic communication with the processor, and instructions stored in the memory. The instructions may be executable by the processor to buffer a first set of coded bits including a first control message having a plurality of fields; to buffer a second set of coded bits including a second control message having the plurality of fields; to soft combine at least a first subset of the first set of coded bits and a second subset of the second set of coded bits in a combined set of coded bits; and to decode the first control message or the second control message based at least in part on the combined set of coded bits.

In some examples of the apparatus, the instructions may be executable by the processor to identify, within the plurality of fields, at least one field having a set of bits that change deterministically from the first control message to the second control message. The instructions may also be executable by the processor to derive, from the set of bits that change deterministically from the first control message to the second control message, a subset of coded bits that differ between the first set of coded bits and the second set of coded bits; and to modify the subset of coded bits in at least one of the first set of coded bits or the second set of coded bits, to place the subset of coded bits in a same state in the first set of coded bits and the second set of coded bits.

In some examples of the apparatus, the instructions may be executable by the processor to generate sequential ranks of the first set of coded bits and the second set of coded bits. Each rank of coded bits may be generated based on a different subset of information bits in the first control message or the second control message, and each lower rank of coded bits may be generated based on a subset of the information bits used to generate a next higher rank of coded bits. In these examples, the soft combining may be performed for the sequential ranks beginning with a lowest rank. In some examples, the instructions may be further executable by the processor to refrain from soft combining a subset of the sequential ranks including at least one sequentially highest rank.

In some examples, the instructions may be further executable by the processor to identify, within the plurality of fields, at least one field having a set of bits that change non-deterministically from the first control message to the second control message, and the refraining may be based at least in part on the identifying. In some examples, the instructions may be further executable by the processor to identify, within the plurality of fields, at least one field having a set of bits that change deterministically from the first control message to the second control message; to derive, from the set of bits that change deterministically from the first control message to the second control message, a subset of coded bits that differ between the first set of coded bits and the second set of coded bits; and to modify the subset of coded bits in at least one of the first set of coded bits or the second set of coded bits to place the subset of coded bits in a same state in the first set of coded bits and the second set of coded bits.

In some examples of the apparatus, the instructions may be executable by the processor to buffer a search space of a control region transmitted during a first slot, in which buffering the search space includes buffering the first set of coded bits. In some examples, the instructions may be executable by the processor to identify a first resource allocation associated with the second set of coded bits, and to identify a second resource allocation associated with the first set of coded bits based at least in part on the first resource allocation associated with the second set of coded bits.

In some examples, the soft combining may be based at least in part on identifying the first resource allocation, identifying the second resource allocation, or both. In some examples, the instructions may be executable by the processor to identify a first resource allocation associated with the first set of coded bits, and to identify a second resource allocation associated with the second set of coded bits based at least in part on the first resource allocation associated with the first set of coded bits. In some examples, the soft combining may be based at least in part on identifying the first resource allocation, identifying the second resource allocation, or both.

In some examples, the apparatus may include instructions executable by the processor to identify a set of bits that differ between the first control message and the second control message; to derive, from the set of bits that differ between the first control message and the second control message, a number of CRC bits that differ for the first control message and the second control message; to identify, based at least in part on the number of CRC bits that differ for the first control message and the second control message, a subset of coded bits that differ between the first set of coded bits and the second set of coded bits; and to modify the subset of coded bits in at least one of the first set of coded bits or the second set of coded bits, to place the subset of coded bits in a same state in the first set of coded bits and the second set of coded bits.

In some examples of the apparatus, the first set of coded bits may correspond to a first set of LLRs and the second set of coded bits may correspond to a second set of LLRs. In some examples, the first set of coded bits and the second set of coded bits may be encoded based at least in part on a convolutional coding of information bits. In some examples, the first set of coded bits and the second set of coded bits may be encoded based at least in part on a polar coding of information bits.

In one example, a non-transitory computer-readable medium storing computer-executable code for wireless communication at a receiving device is described. The code may be executable by the processor to buffer a first set of coded bits including a first control message having a plurality of fields; to buffer a second set of coded bits including a second control message having the plurality of fields; to soft combine at least a first subset of the first set of coded bits and a second subset of the second set of coded bits in a combined set of coded bits; and to decode the first control message or the second control message based at least in part on the combined set of coded bits.

In some examples of the non-transitory computer-readable medium, the code may be executable by the processor to identify, within the plurality of fields, at least one field having a set of bits that change deterministically from the first control message to the second control message. The code may also be executable by the processor to derive, from the set of bits that change deterministically from the first control message to the second control message, a subset of coded bits that differ between the first set of coded bits and the second set of coded bits; and to modify the subset of coded bits in at least one of the first set of coded bits or the second set of coded bits, to place the subset of coded bits in a same state in the first set of coded bits and the second set of coded bits.

In some examples of the non-transitory computer-readable medium, the code may be executable by the processor to generate sequential ranks of the first set of coded bits and the second set of coded bits. Each rank of coded bits may be generated based on a different subset of information bits in the first control message or the second control message, and each lower rank of coded bits may be generated based on a subset of the information bits used to generate a next higher rank of coded bits.

In these examples, the soft combining may be performed for the sequential ranks beginning with a lowest rank. In some examples, the code may be further executable by the processor to refrain from soft combining a subset of the sequential ranks including at least one sequentially highest rank. In some examples, the code may be further executable by the processor to identify, within the plurality of fields, at least one field having a set of bits that change non-deterministically from the first control message to the second control message, and the refraining may be based at least in part on the identifying.

In some examples, the code may be further executable by the processor to identify, within the plurality of fields, at least one field having a set of bits that change deterministically from the first control message to the second control message; to derive, from the set of bits that change deterministically from the first control message to the second control message, a subset of coded bits that differ between the first set of coded bits and the second set of coded bits; and to modify the subset of coded bits in at least one of the first set of coded bits or the second set of coded bits to place the subset of coded bits in a same state in the first set of coded bits and the second set of coded bits.

In some examples of the non-transitory computer-readable medium, the code may be executable by the processor to buffer a search space of a control region transmitted during a first slot, in which buffering the search space includes buffering the first set of coded bits. In some examples, the code may be executable by the processor to identify a first resource allocation associated with the second set of coded bits, and to identify a second resource allocation associated with the first set of coded bits based at least in part on the first resource allocation associated with the second set of coded bits. In some examples, the soft combining may be based at least in part on identifying the first resource allocation, identifying the second resource allocation, or both.

In some examples, the code may be executable by the processor to identify a first resource allocation associated with the first set of coded bits, and to identify a second resource allocation associated with the second set of coded bits based at least in part on the first resource allocation associated with the first set of coded bits. In some examples, the soft combining may be based at least in part on identifying the first resource allocation, identifying the second resource allocation, or both.

In some examples, the non-transitory computer-readable medium may include code executable by the processor to identify a set of bits that differ between the first control message and the second control message; to derive, from the set of bits that differ between the first control message and the second control message, a number of CRC bits that differ for the first control message and the second control message; to identify, based at least in part on the number of CRC bits that differ for the first control message and the second control message, a subset of coded bits that differ between the first set of coded bits and the second set of coded bits; and to modify the subset of coded bits in at least one of the first set of coded bits or the second set of coded bits, to place the subset of coded bits in a same state in the first set of coded bits and the second set of coded bits.

In some examples of the non-transitory computer-readable medium, the first set of coded bits may correspond to a first set of LLRs and the second set of coded bits may correspond to a second set of LLRs. In some examples, the first set of coded bits and the second set of coded bits may be encoded based at least in part on a convolutional coding of information bits. In some examples, the first set of coded bits and the second set of coded bits may be encoded based at least in part on a polar coding of information bits.

In one example, an apparatus for wireless communication at a receiving device is described. The apparatus may include means for buffering a first set of coded bits including a first control message having a plurality of fields; means for buffering a second set of coded bits including a second control message having the plurality of fields; means for soft combining at least a first subset of the first set of coded bits and a second subset of the second set of coded bits in a combined set of coded bits; and means for decoding the first control message or the second control message based at least in part on the combined set of coded bits.

In some examples, the apparatus may include means for identifying, within the plurality of fields, at least one field having a set of bits that change deterministically from the first control message to the second control message. The apparatus may also include means for deriving, from the set of bits that change deterministically from the first control message to the second control message, a subset of coded bits that differ between the first set of coded bits and the second set of coded bits; and means for modifying the subset of coded bits in at least one of the first set of coded bits or the second set of coded bits, to place the subset of coded bits in a same state in the first set of coded bits and the second set of coded bits.

In some examples, the apparatus may include means for generating sequential ranks of the first set of coded bits and the second set of coded bits. Each rank of coded bits may be generated based on a different subset of information bits in the first control message or the second control message, and each lower rank of coded bits may be generated based on a subset of the information bits used to generate a next higher rank of coded bits. In these examples, the soft combining may be performed for the sequential ranks beginning with a lowest rank.

In some examples, the apparatus may further include means for refraining from soft combining a subset of the sequential ranks including at least one sequentially highest rank. In some examples, the apparatus may further include means for identifying, within the plurality of fields, at least one field having a set of bits that change non-deterministically from the first control message to the second control message, and the refraining may be based at least in part on the identifying. In some examples, the apparatus may further include means for identifying, within the plurality of fields, at least one field having a set of bits that change deterministically from the first control message to the second control message; means for deriving, from the set of bits that change deterministically from the first control message to the second control message, a subset of coded bits that differ between the first set of coded bits and the second set of coded bits; and means for modifying the subset of coded bits in at least one of the first set of coded bits or the second set of coded bits to place the subset of coded bits in a same state in the first set of coded bits and the second set of coded bits.

In some examples, the apparatus may include means for buffering a search space of a control region transmitted during a first slot, in which buffering the search space includes buffering the first set of coded bits. In some examples, the apparatus may include means for identifying a first resource allocation associated with the second set of coded bits, and means for identifying a second resource allocation associated with the first set of coded bits based at least in part on the first resource allocation associated with the second set of coded bits.

In some examples, the soft combining may be based at least in part on identifying the first resource allocation, identifying the second resource allocation, or both. In some examples, the apparatus may include means for identifying a first resource allocation associated with the first set of coded bits, and means for identifying a second resource allocation associated with the second set of coded bits based at least in part on the first resource allocation associated with the first set of coded bits. In some examples, the soft combining may be based at least in part on identifying the first resource allocation, identifying the second resource allocation, or both.

In some examples, the apparatus may include means for identifying a set of bits that differ between the first control message and the second control message; means for deriving, from the set of bits that differ between the first control message and the second control message, a number of CRC bits that differ for the first control message and the second control message; means for identifying, based at least in part on the number of CRC bits that differ for the first control message and the second control message, a subset of coded bits that differ between the first set of coded bits and the second set of coded bits; and means for modifying the subset of coded bits in at least one of the first set of coded bits or the second set of coded bits, to place the subset of coded bits in a same state in the first set of coded bits and the second set of coded bits.

In some examples of the apparatus, the first set of coded bits may correspond to a first set of LLRs and the second set of coded bits may correspond to a second set of LLRs. In some examples, the first set of coded bits and the second set of coded bits may be encoded based at least in part on a convolutional coding of information bits. In some examples, the first set of coded bits and the second set of coded bits may be encoded based at least in part on a polar coding of information bits.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
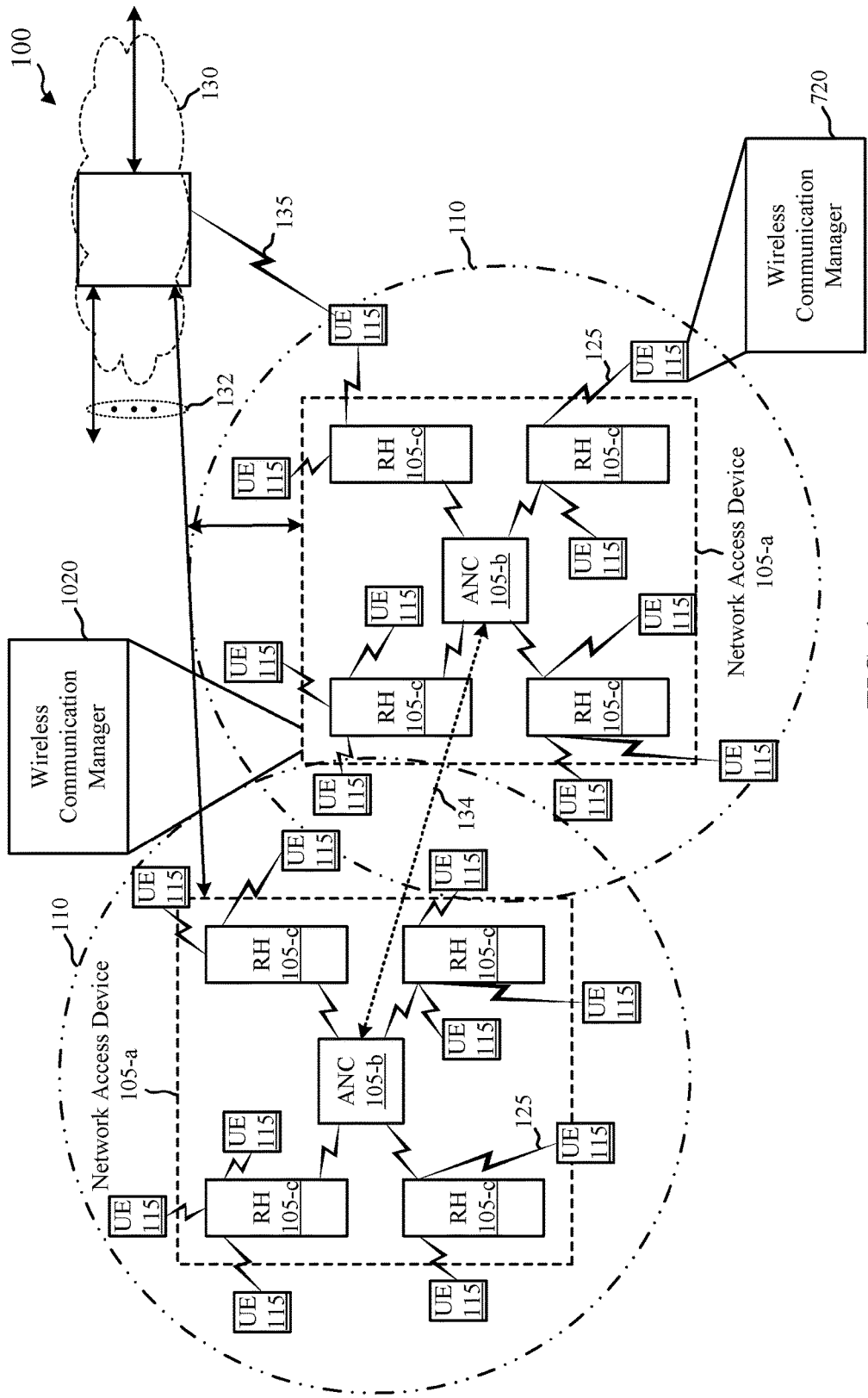
FIG. 1 shows an example of a wireless communication system, in accordance with one or more aspects of the disclosure.

Techniques are described in which control transmissions are soft combined. Unlike HARQ retransmissions of data, which always carry the same data as prior transmissions or retransmissions of the data, control transmissions and retransmissions (also known as control signals, control messages, or control channel messages) may or may not vary in content. In some examples, a first control message may be encoded by a transmitting device (e.g., using convolutional coding or polar coding) and transmitted to a receiving device. The receiving device may receive the transmission, but may not be able to properly decode the transmission. In this case, the receiving device may buffer the transmission until receipt of another or next control transmission from the transmitting device. Upon receipt of the other or next control transmission, the receiving device may buffer the other or next control transmission. In some examples, the receiving device may calculate LLRs for the coded bits of each control transmission. In some examples, the buffered transmissions may include and/or correspond to the calculated LLRs.

In some cases, the interference associated with a received control transmission may be so great, or the SNR may be so low, that a receiving device is unable to identify the control transmission within a search space of a control region. In these cases, the receiving device may buffer the entire control region, or part of the control region conforming to the receiving device's search space within the control region. Upon receiving another or next control transmission that is not decodable by the receiving device, the receiving device may use the later-received control transmission to identify a set of bits in the buffered control region or search space (e.g., a resource allocation) corresponding to an earlier-received control transmission. Similarly, an earlier-received control transmission that is not decodable may be used to identify a set of bits in a buffered search space (e.g., a resource allocation) corresponding to a later-received control transmission.

After receiving at least a first control transmission and a second control transmission, the receiving device may attempt to soft combine the transmissions. A soft combination of two or more transmissions may yield a combined transmission having an improved SNR.

Each of a number of received control transmissions may include a plurality of fields. Some fields (and in some cases, all of the fields) may contain the same control information across multiple transmissions (e.g., across two or more transmissions). Other fields (and in some cases, all of the fields) may contain different control information across different transmissions. Before or during the soft combination of two or more control transmissions, a receiving device may identify each field of the control transmissions as a field having bits that are unchanged from one control transmission to another control transmission, a field having bits that change deterministically from one control transmission to another control transmission, a field having bits that change non-deterministically from one control transmission to another control transmission, or a field including a number of CRC bits. In some cases, a receiving device's knowledge of the deterministic bit changes that occur in some fields of a control message, across transmissions and retransmissions of the control message, may be used to identify changes in encoded transmissions of the control messages (i.e., changes in the coded bits of the encoded transmissions). The identified changes in coded bits can then be used to modify the coded bits in one or more of the encoded transmissions, so that the coded bits are in the same state and the coded bits of the encoded transmissions may be soft combined (e.g., LLRs for these coded bits may be soft combined). In some cases, a receiving device's knowledge of non-deterministic bit changes that occur in some fields of a control message, across transmissions and retransmissions of the control message, may also be used to identify changes in encoded transmissions of the control messages (i.e., changes in the coded bits of the encoded transmissions). The identified changes in coded bits can then be used to refrain from soft combining these coded bits (e.g., refrain from soft combining LLRs for these coded bits).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples. In addition, although it is contemplated that LLRs for coded bits may be soft combined, the applications described herein are not so limited and may include, for example, soft combining other probabilistic values.

FIG. 1 shows an example of a wireless communication system 100, in accordance with one or more aspects of the disclosure. The wireless communication system 100 may include network access devices 105 (which may be examples of a base station, an eNB, a RH, an ANC, or a gNB), UEs 115, and a core network 130. In some examples, the wireless communication system 100 may be LTE/LTE-A network, or a New Radio (NR) system (5G). The core network 130 may provide user authentication, access authorization, tracking, Internet Protocol (IP) connectivity, and other access, routing, or mobility functions. At least some of the network access devices 105 (e.g., eNBs, network access devices, gNBs, network access devices 105-*a* or ANCs 105-*b*) may interface with the core network 130 through backhaul links 132 (e.g., S1, S2, etc.) and may perform radio configuration and scheduling for communication with the UEs 115. In various examples, the ANCs 105-*b* may communicate, either directly or indirectly (e.g., through core network 130), with each other over backhaul links 134 (e.g., X1, X2, etc.), which may be wired or wireless communication links. In some examples, a UE 115 may communicate with the core network 130 through communication link 135. Each ANC 105-*b* may also communicate with a number of UEs 115 through a number of smart radio heads (RHs 105-*c* or gNBs). In an alternative configuration of the wireless communication system 100, the functionality of an ANC 105-*b* may be provided by a radio head 105-*c* or distributed across the radio heads 105-*c* of a network access device 105-*a*. In another alternative configuration of the wireless communication system 100 (e.g., an LTE/LTE-A configuration), the radio heads 105-*c* may be replaced with base stations, and the ANCs 105-*b* may be replaced by base station controllers (or links to the core network 130). In some examples, the wireless communication system 100 may include a mix of radio heads 105-*c*, base stations, and/or other network access devices 105 for receiving/transmitting communications according to different radio access technologies (RATs) (e.g., LTE/LTE-A, 5G, Wi-Fi, etc.). In some examples, a UE 115 may communicate with the core network 130 through communication link 135.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, macro gNBs, small cell gNBs, relay base stations, and the like.

Base stations may include or may be referred to by those skilled in the art as a base transceiver station, a radio base station, an access point, a radio transceiver, a NodeB, a gNB, eNB, Home NodeB, a Home eNB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro gNBs, small cell gNBs, macro eNBs, small cell eNBs, relay base stations, and the like. There may be overlapping geographic coverage areas for different technologies.

The wireless communication system 100 may support synchronous or asynchronous operation. For synchronous operation, the network access devices 105-*a* and/or radio heads 105-*c* may have similar frame timing, and transmissions from different network access devices 105-*a* and/or radio heads 105-*c* may be approximately aligned in time. For asynchronous operation, the network access devices 105-*a* and/or radio heads 105-*c* may have different frame timings, and transmissions from different network access devices 105-*a* and/or radio heads 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a radio head 105-*c*, ANC 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of network access devices 105-*a*, radio heads 105-*c*, base stations, access points, or other network access devices, including macro gNBs, small cell gNBs, macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplinks (ULs) from a UE 115 to a radio head 105-*c*, and/or downlinks (DLs), from a radio head 105-*c* to a UE 115. The downlinks may also be called forward links, while the uplinks may also be called reverse links. Control information and data may be multiplexed on an uplink or downlink according to various techniques. Control information and data may be multiplexed on an uplink or downlink, for example, using time-division multiplexing (TDM) techniques, frequency-division multiplexing (FDM) techniques, or hybrid TDM-FDM techniques.

One or more of the UEs 115 may include a wireless communication manager 720. In some examples, the wireless communication manager 720 may be an example of the wireless communication manager 720 described with reference to FIG. 7, 8, 9, or 11, and may be used to buffer a first set of coded bits including a first control message having a plurality of fields, buffer a second set of coded bits including a second control message having the plurality of fields, soft combine at least a first subset of the first set of coded bits and a second subset of the second set of coded bits in a combined set of coded bits, and decode the first control message or the second control message based at least in part on the combined set of coded bits.

One or more of the network access devices 105 (e.g., one or more network access devices 105-*a*) may include a wireless communication manager 1020. In some examples, the wireless communication manager 1020 may be an example of the wireless communication manager 1020 described with reference to FIG. 10 or 12, and may be used to transmit and retransmit data and/or control messages to the UEs 115. The wireless communication manager 1020 may also be used to encode control transmissions in a manner that enables UEs to decode and soft combine selected fields of the control transmissions.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the radio heads 105-*c* and/or UEs 115 may include multiple antennas for employing antenna diversity schemes to improve communication quality and reliability between radio heads 105-*c* and UEs 115. Additionally or alternatively, radio heads 105-*c* and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

While data transmissions and retransmissions are often combined in wireless communication systems, control transmissions are not soft combined, because the information contained in different control transmissions may or may not differ (unlike the information contained in a transmission and retransmission(s) of data). To complicate matters, a UE may be unable to distinguish between a first scenario, in which the UE receives a control message during a slot or TTI but is unable to properly decode the control message, and a second scenario in which the UE does not receive a control message during a slot or TTI. Further, even if a UE could be notified that there are two consecutive transmissions of the same control message, the UE would need to test multiple hypotheses (and in some cases, a large number of hypotheses) to determine the resource allocations of the two control messages and perform soft combining. TTI relates to a duration of a transmission. As used herein, the term "slot" may include, but is not limited to, a TTI (and vice versa), and need not refer exclusively to half of a 1 ms subframe. The term "slot" may also include other examples that are different from a TTI.

The present disclosure describes a number of techniques that may be used by a receiving device to facilitate soft combining of control transmissions. The techniques include identifying the types of fields in a set of control transmissions. The types of fields that may be included in a control message may include, for example, one or more fields having bits that are unchanged from a first control message to a second control message, one or more fields having bits that change deterministically from a first control message to a second control message, one or more fields having bits that change non-deterministically from a first control message to a second control message, or at least one field including a number of CRC bits. Fields having bits that are unchanged from a first control message to a second control message may be referred to herein as type-I fields and may include, for example, modulation and coding scheme (MCS) and resource allocation fields that do not change in value across transmissions and retransmissions (e.g., MCS and resource allocation fields that are indicated, by a communication standard, to remain constant across transmissions and retransmissions). Fields having bits that change deterministically from a first control message to a second control message may be referred to herein as type-II fields and may include, for example, a redundancy version and new data indicator (RV/NDI) field (e.g., a RV/NDI field may have a value of RV/NDI=0 for a new transmission, a value of RV/NDI=1 for a first retransmission, and a value of RV/NDI=2 for a second retransmission). Fields having bits that change non-deterministically from a first control message to a second control message may be referred to herein as type-III fields. In some examples, a receiving device may identify the types of fields included in a control transmission based on rules defined in a communication standard, such as rules defining how control messages are configured or formatted, or rules defining how control messages are configured or formatted across multiple control transmissions. For example, a communication standard may indicate that, for new transmissions, RV/NDI=0, for first retransmissions, RV/NDI=1, etc. As another example, a communication standard may indicate that an eNB or a gNB may not change a UE's MCS across data retransmissions, in which case an MCS field can be identified by a UE as a type-I field.

Some techniques described herein include performing a modified soft combining, in which bits associated with some types of fields (e.g., type-II fields or CRC fields) may be modified before soft combining control transmissions (e.g., a modified soft combining may be performed). Bits associated with other fields (e.g., type-II fields) may not be soft combined (e.g., a partial soft combining may be performed).

Some techniques described herein include buffering (e.g., caching) a search space of a control region in which a control transmission for a UE may be received, and identifying a resource allocation for the control transmission (and the control transmission) based at least in part on a resource allocation of an earlier-received or later-received control transmission. For example, the resource allocations of successive control transmissions may have a predetermined relationship. In some examples, identifying a first resource allocation may include identifying a location of the control message in the search space (e.g., with respect to the location of the control message in the search space).

Figure 2:
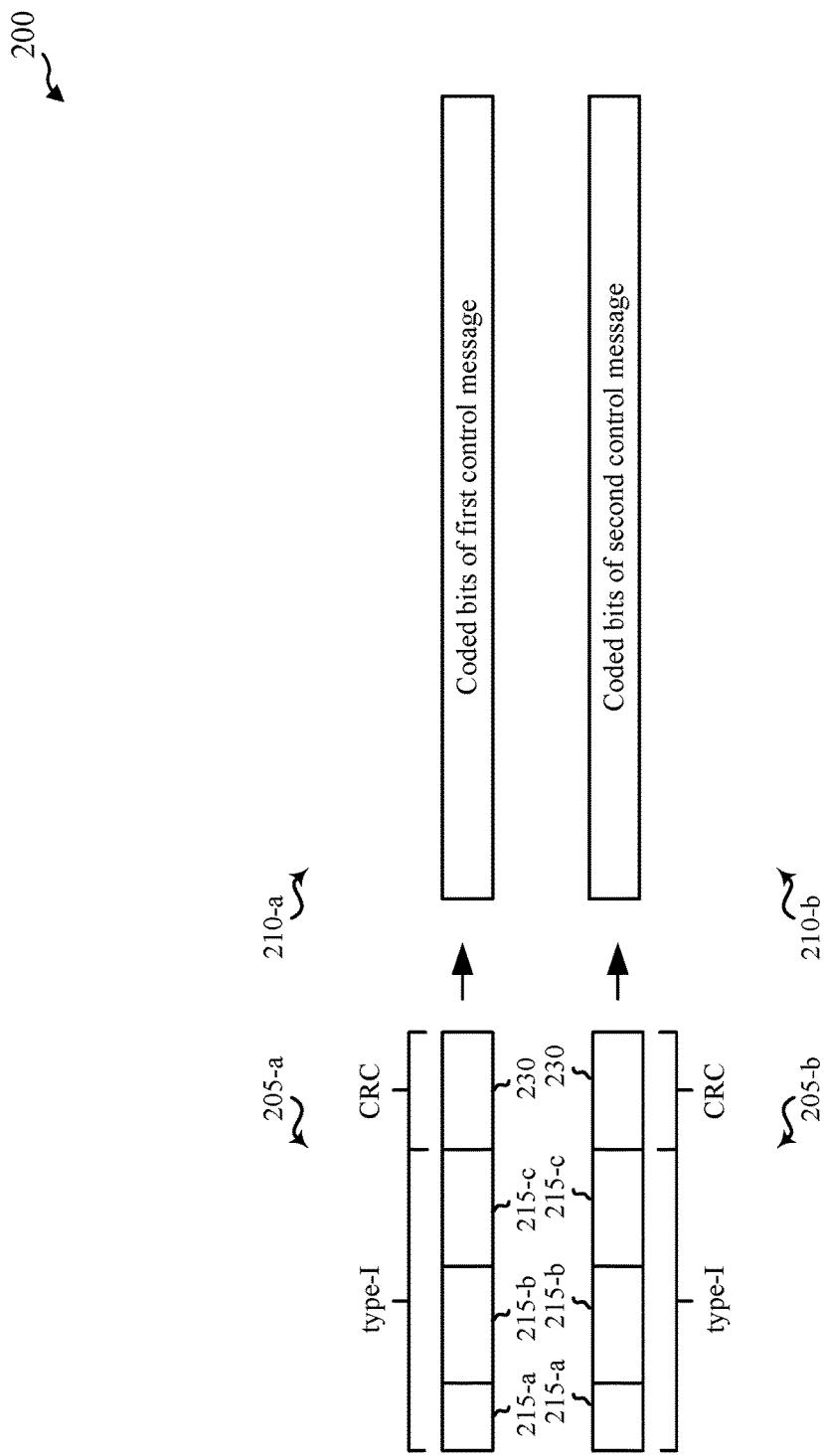
FIG. 2 shows first and second control messages that are respectively encoded in sets of coded bits, which sets of coded bits may be soft combined in accordance with one or more aspects of the present disclosure.

FIG. 2 shows first and second control messages (e.g., a first control message 205-a and a second control message 205-b) that are respectively encoded in sets of coded bits (e.g., a first set of coded bits 210-a and a second set of coded bits 210-b), which first and second sets of coded bits may be soft combined in accordance with one or more aspects of the present disclosure. In some examples, each of the first and second control messages may have a plurality of fields, and each of the first and second control messages may be separately encoded (e.g., by a transmitting device). In some examples, each of the control messages may be encoded based at least in part on a convolutional coding of information bits or a polar coding of information bits. Each of the encoded control messages may be separately transmitted to a receiving device. The second control message 205-b may be a retransmission of the first control message 205-a. The receiving device may calculate LLRs for the coded bits of each control message. In some examples, the first set of coded bits 210-a may correspond to a first set of LLRs associated with the first control message 205-a, and the second set of coded bits 210-b may correspond to a second set of LLRs associated with the second control message 205-b.

Each of the first control message 205-a and the second control message 205-b may include a plurality of fields. By way of example, each of the first control message 205-a and the second control message 205-b is shown to have a plurality of type-I fields (e.g., fields 215-a, 215-b, and 215-c) and a CRC field 230. Because the bits of type-I fields do not change between a first control message and a second control message (in which the second control message is, at least in part, a retransmission of the first control message), there will be no difference, absent interference and noise, in the bits of the type-I fields 215 of the first and second control messages. Also, and because there are no differences in the bits of the type-I fields 215, there will be no difference in the bits of the CRC field 230. Thus, the first set of coded bits 210-a may be soft combined with the second set of coded bits 210-b in a combined set of coded bits (e.g., by combining LLRs), and the first control message 205-a or the second control message 205-b may be decoded based at least in part on the combined set of coded bits.

Figure 3:
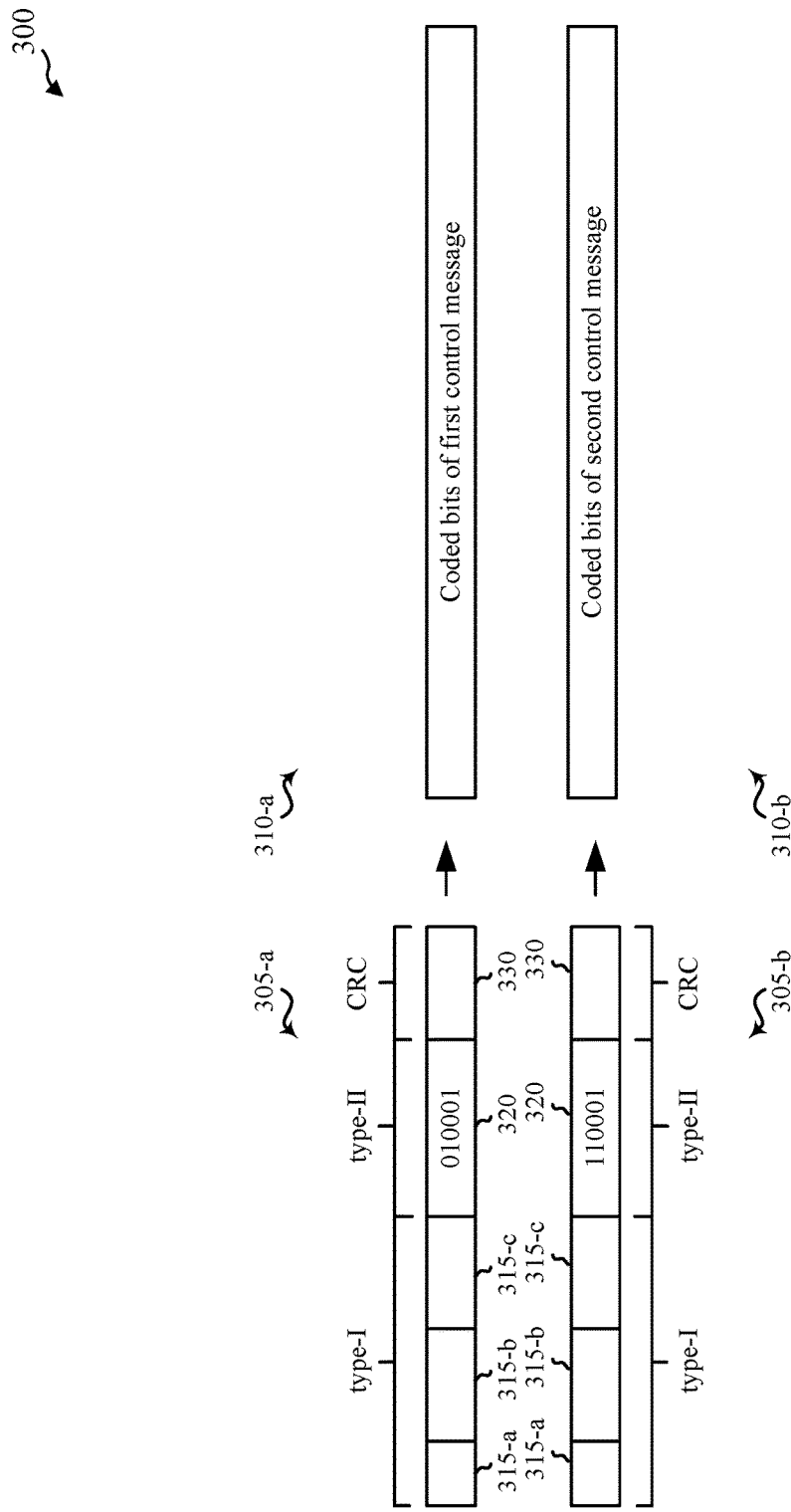
FIG. 3 shows first and second control messages that are respectively encoded in sets of coded bits, which sets of coded bits may be soft combined in accordance with one or more aspects of the present disclosure.

FIG. 3 shows first and second control messages (e.g., a first control message 305-a and a second control message 305-b) that are respectively encoded in sets of coded bits (e.g., a first set of coded bits 310-a and a second set of coded bits 310-b), which first and second sets of coded bits may be soft combined in accordance with one or more aspects of the present disclosure. In some examples, each of the first and second control messages may have a plurality of fields, and each of the first and second control messages may be separately encoded (e.g., by a transmitting device). In some examples, each of the control messages may be encoded based at least in part on a convolutional coding of information bits or a polar coding of information bits. Each of the encoded control messages may be separately transmitted to a receiving device. The second control message 305-b may be a retransmission of the first control message 305-a. The receiving device may calculate LLRs for the coded bits of each control message. In some examples, the first set of coded bits 310-a may correspond to a first set of LLRs associated with the first control message 305-a (i.e., the first set of LLRs associated with the first control message 305-a and the first set of coded bits 310-a correspond with each other), and the second set of coded bits 310-b may correspond to a second set of LLRs associated with the second control message 305-b (i.e., the second set of LLRs associated with the first control message 305-b and the second set of coded bits 310-b correspond with each other).

Each of the first control message 305-a and the second control message 305-b may include a plurality of fields. By way of example, each of the first control message 305-a and the second control message 305-b is shown to have a plurality of type-I fields (e.g., fields 315-a, 315-b, and 315-c), a type-II field 320, and a CRC field 330. Because the bits of type-I fields do not change between a first control message and a second control message (in which the second control message is, at least in part, a retransmission of the first control message), there will be no difference, absent interference and noise, in the bits of the type-I fields 315 of the first and second control messages. There may, however, be differences in the bits of the type-II field 320 of the first and second control messages.

Because the bits of a type-II field 320 change deterministically between a first control message and a second control message (in which the second control message is, at least in part, a retransmission of the first control message), one or more coded bits in the first set of coded bits 310-a or the second set of coded bits 310-b may need to be modified (e.g., flipped) to place the coded bits of the first set of coded bits 310-a and the second set of coded bits 310-b in the same state in each of the first set of coded bits 310-a and the second set of coded bits 310-b. Of note, the values of the bits in the control messages that change deterministically need not be known. Just the locations of the bits, and in some cases the manner in which the bits deterministically change, need be known. In some examples, modifying the coded bits of the first set of coded bits 310-a or the second set of coded bits 310-b may include identifying a set of bits (e.g., information bits or uncoded bits) that change deterministically from the first control message 305-a to the second control message 305-b, and deriving, from the set of bits that change deterministically from the first control message 305-a to the second control message 305-b, a subset of coded bits that differ between the first set of coded bits 310-a and the second set of coded bits 310-b. The subset of coded bits may be modified in at least one of the first set of coded bits 310-a or the second set of coded bits 310-b, to place the subset of coded bits in a same state in the first set of coded bits 310-a and the second set of coded bits 310-b.

Because there are differences in the bits of the type-II field 320, there will be differences in the bits of the CRC field 330. Thus, further coded bits of the first set of coded bits 310-a or second set of coded bits 310-b may need to be modified before the first set of coded bits 310-a may be soft combined with the second set of coded bits 310-b in a combined set of coded bits. Thus, in some examples, the receiving device may identify a set of bits that differ between the first control message 305-a and the second control message 305-b (e.g., the set of bits that differ in the type-II field 320 in FIG. 3), and derive, from the set of bits that differ between the first control message 305-a and the second control message 305-b, a number of CRC bits that differ for the first control message 305-a and the second control message 305-*b*. The receiving device may identify, based at least in part on the number of CRC bits that differ for the first control message 305-*a* and the second control message 305-*b*, a subset of coded bits that differ between the first set of coded bits 310-*a* and the second set of coded bits 310-*b*. The receiving device may modify the subset of coded bits in at least one of the first set of coded bits 310-*a* or the second set of coded bits 310-*b*, to place the subset of coded bits in a same state in the first set of coded bits 310-*a* and the second set of coded bits 310-*b*.

After performing the above-described modifications to the first set of coded bits 310-*a* or the second set of coded bits 310-*b*, the first set of coded bits 310-*a* may be soft combined with the second set of coded bits 310-*b* in a combined set of coded bits (e.g., by combining LLRs), and the first control message 305-*a* or the second control message 305-*b* may be decoded based at least in part on the combined set of coded bits.

Figure 4:
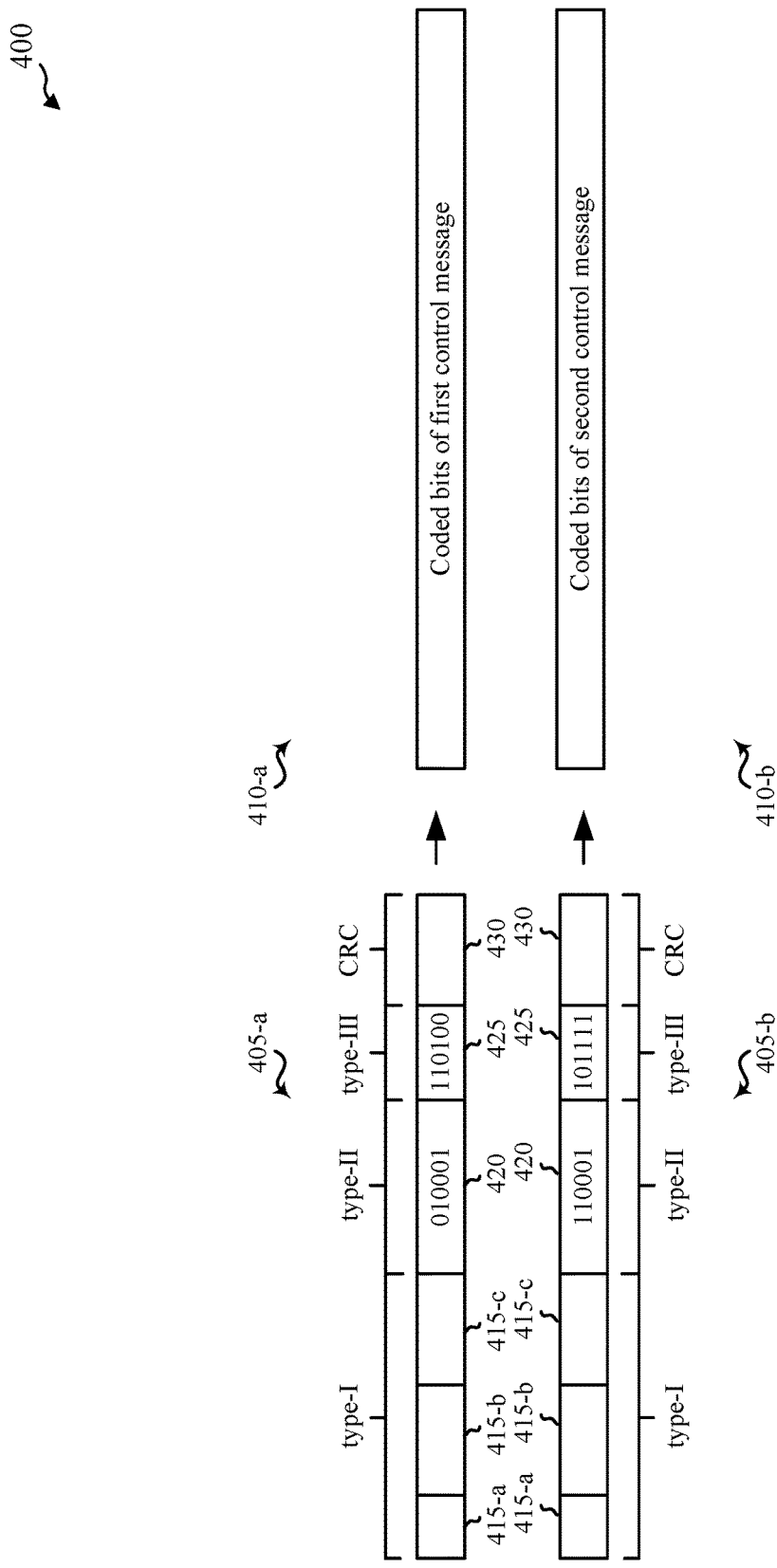
FIG. 4 shows first and second control messages that are respectively encoded in sets of coded bits, which sets of coded bits may be soft combined in accordance with one or more aspects of the present disclosure.

FIG. 4 shows first and second control messages (e.g., a first control message 405-*a* and a second control message 405-*b*) that are respectively encoded in sets of coded bits (e.g., a first set of coded bits 410-*a* and a second set of coded bits 410-*b*), which first and second sets of coded bits may be soft combined in accordance with one or more aspects of the present disclosure. In some examples, each of the first and second control messages may have a plurality of fields, and each of the first and second control messages may be separately encoded (e.g., by a transmitting device). In some examples, each of the control messages may be encoded based at least in part on a convolutional coding of information bits or a polar coding of information bits. Each of the encoded control messages may be separately transmitted to a receiving device. The second control message 405-*b* may be a retransmission of the first control message 405-*a*. The receiving device may calculate LLRs for the coded bits of each control message. In some examples, the first set of coded bits 410-*a* may correspond to a first set of LLRs associated with the first control message 405-*a*, and the second set of coded bits 410-*b* may correspond to a second set of LLRs associated with the second control message 405-*b*.

Each of the first control message 405-*a* and the second control message 405-*b* may include a plurality of fields. By way of example, each of the first control message 405-*a* and the second control message 405-*b* is shown to have a plurality of type-I fields (e.g., fields 415-*a*, 415-*b*, and 415-*c*), a type-II field 420, a type-III field 425, and a CRC field 430. Because the bits of type-I fields 415 do not change between a first control message and a second control message (in which the second control message is, at least in part, a retransmission of the first control message), there will be no difference, absent interference and noise, in the bits of the type-I fields 415 of the first and second control messages. There may, however, be differences in the bits of the type-II field 420 or the type-III field 425 of the first and second control messages.

Deterministic changes in the bits of the type-II field 420, and modifications to the first set of coded bits 410-*a* or the second set of coded bits 410-*b*, may be handled as described with reference to FIG. 3.

Because the bits of a type-III field change non-deterministically between a first control message and a second control message (in which the second control message is, at least in part, a retransmission of the first control message), a receiving device may refrain from soft combining coded bits in the first set of coded bits 410-*a* or the second set of coded bits 410-*b* that are based at least in part on the bits of the type-III field (because the receiving device cannot determine what combination of bits in the type-III field changed between the first control message and the second control message, or how).

Because there are differences in the bits of the type-II field 420 and the type-III field 425, there will be differences in the bits of the CRC field 430. Because of the non-deterministic changes that may exist in the type-III field 425, coded bits in the first set of coded bits 410-*a* or second set of coded bits 410-*b*, which coded bits are derived at least in part from bits of the CRC field 430, may not be soft-combined.

After performing the above-described modifications to the first set of coded bits 410-*a* or the second set of coded bits 410-*b*, the first set of coded bits 410-*a* may be partially soft combined with the second set of coded bits 410-*b* in a combined set of coded bits (e.g., by combining LLRs), and the first control message 405-*a* or the second control message 405-*b* may be decoded based at least in part on the combined set of coded bits.

Figure 5:
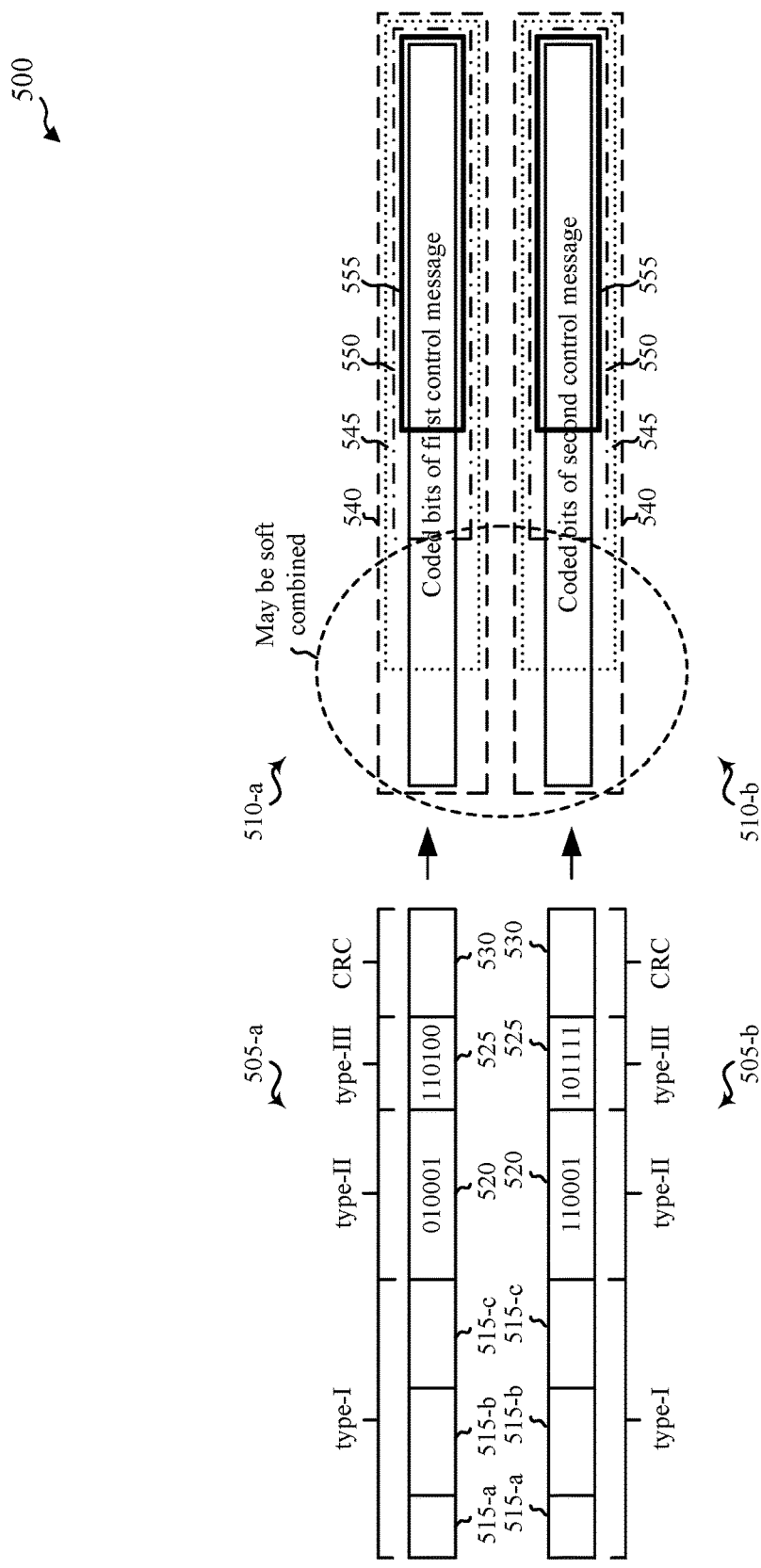
FIG. 5 shows first and second control messages that are respectively encoded in sets of coded bits, which sets of coded bits may be soft combined in accordance with one or more aspects of the present disclosure.

FIG. 5 shows first and second control messages (e.g., a first control message 505-*a* and a second control message 505-*b*) that are respectively encoded in sets of coded bits (e.g., a first set of coded bits 510-*a* and a second set of coded bits 510-*b*), which first and second sets of coded bits may be soft combined in accordance with one or more aspects of the present disclosure. By way of example, each of the first control message 505-*a* and the second control message 505-*b* may have the same plurality of fields as the first control message 405-*a* and the second control message 405-*b* described with reference to FIG. 4, and each of the first and second control messages may be separately encoded (e.g., by a transmitting device). However, in contrast to the first and second control messages described with reference to FIG. 4, the information bits of each control message shown in FIG. 5 may be divided into subsets of different rank (e.g., rank-1, rank-2, . . . information bits) and encoded in coded bits of different rank (e.g., rank-1, rank-2, . . . coded bits). The coded bits of a rank n are dependent on information bits of rank n or lower, and are independent of information bits of rank n+1 or higher. As shown in FIG. 5, the bits of the type-I fields 515 may be encoded in a set of rank-I coded bits 540; the bits of both the type-I fields 515 and the type-II field 520 may be encoded in a set of rank-II coded bits 545; the bits of the type-I fields 515, the type-II field 520, and the type-III field 525 may be encoded in a set of rank-III coded bits 550; and the bits of the type-I fields 515, the type-II field 520, the type-III field 525, and the CRC bits 530 may be encoded in a set of rank-IV coded bits 555.

In some examples, each of the first and second control messages may be encoded based at least in part on a convolutional coding of information bits or a polar coding of information bits. Each of the encoded control messages may be separately transmitted to a receiving device. The second control message 505-*b* may be a retransmission of the first control message 505-*a*. The receiving device may calculate LLRs for the coded bits of each control message. In some examples, the first set of coded bits 510-*a* may correspond to a first set of LLRs associated with the first control message 505-*a*, and the second set of coded bits 510-*b* may correspond to a second set of LLRs associated with the second control message 505-*b*.

If the bits of each control message are encoded such that the bits of the type-I fields 515 are encoded at a lower rank than the bits of the type-II field 520 and the type-III field 525, and the bits of the type-II field 520 are encoded at a lower rank than the bits of the type-III field 525, then a subset of the coded bits (i.e., a subset of the first set of coded bits 510-*a* or a subset of the second subset of coded bits 510-*b*) may be encoded independently of bits that change non-deterministically, and coded bits based on these subsets of information bits may be soft combined.

In each of the examples described with reference to FIG. 2, 3, 4, or 5, and in other examples, there may be scenarios in which the receiving device is unable to decode the first control message or the second control message, and thus, the receiving device may assume that the first control message or second control message was not transmitted. When the receiving device assumes that a control message has not been transmitted, when in fact the control message has been transmitted, the transmitting device may retransmit a control message again, and the receiving device may search for an additional retransmitted control message. This causes both the transmitting device and the receiving device to incur additional delay and consume additional power. To mitigate the need to retransmit a control message, a transmitting device may retransmit a control message using a resource allocation that has a defined relationship with respect to the resource allocation of a first transmission or prior retransmission of the control message. When the receiving device is unable to decode a first control message transmitted in a search space of a control region of a first slot or TTI, the receiving device may buffer the search space of the control region and wait to receive a retransmission of the control message (i.e., a second control message). If the receiving device is able to decode the retransmitted control message (i.e., the second control message or later-transmitted control message), the receiving device may identify a resource allocation associated with the second control message, and identify a resource allocation associated with the first control message based at least in part on the resource allocation associated with the second control message. When the receiving device is able to decode the first control message and identify a resource allocation associated with the first control message, the receiving device may use the resource allocation associated with the first control message to identify a resource allocation associated with a second control message (i.e., a retransmission of the control message).

Figure 6:
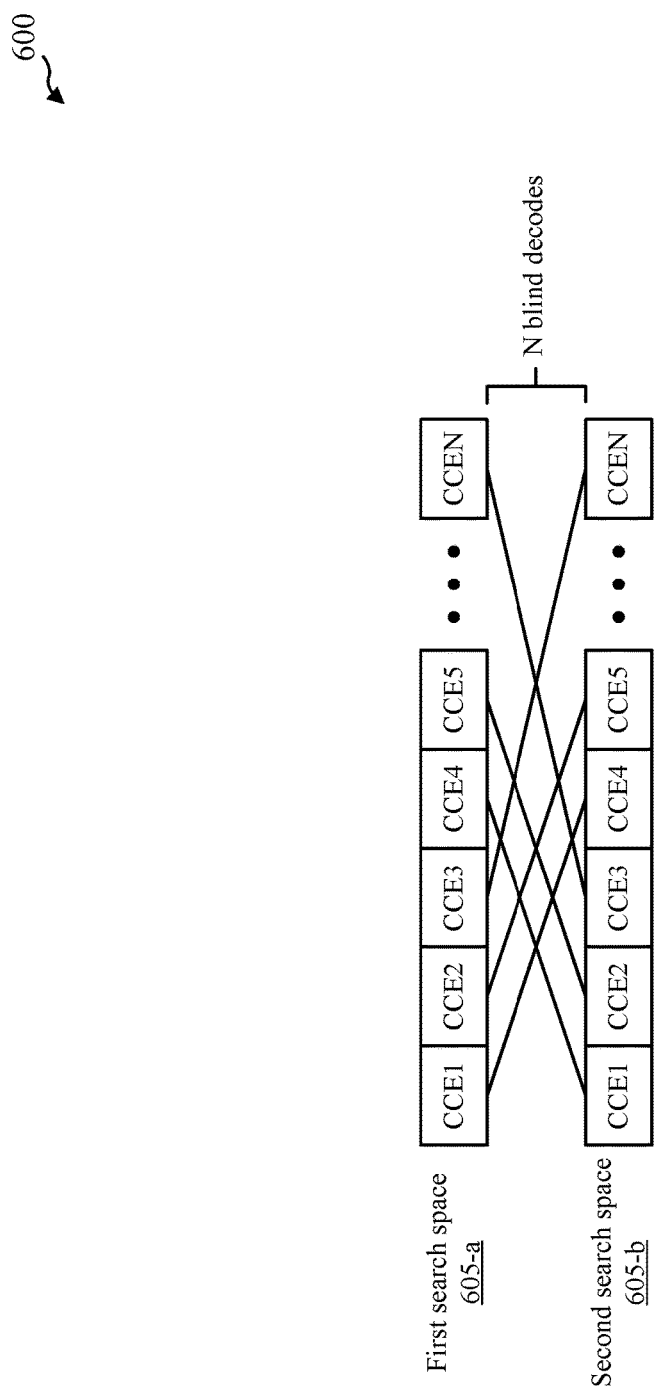
FIG. 6 shows a cross-transmission time interval (TTI) search space, in accordance with one or more aspects of the present disclosure.

FIG. 6 shows a cross-TTI search space 600, in accordance with one or more aspects of the present disclosure. The cross-TTI search space 600 includes a first search space 605-*a* within a control region of a first slot or TTI (e.g., an earlier-transmitted slot or TTI), and a second search space 605-*b* within a control region of a second slot or TTI (e.g., a later-transmitted TTI).

In some examples, a receiving device may need to perform up to N blind decodes to identify a control message transmitted to the receiving device during a slot or TTI. The N blind decodes may traverse all potential resource allocations and aggregation levels within a search space of a control region. Each of the N blind decodes may be associated with a resource allocation bounded by one of N control channel elements (CCEs).

When a receiving device is unable to decode a control transmission in each of the first slot or TTI and the second slot or TTI, the receiving device may attempt N*N soft combinations of control transmissions, which may entail a large number of blind decodes and potentially increase a false alarm rate. To limit the number of blind decodes that a receiving device needs to perform, transmissions of control messages within the search spaces may be restricted such that, for each blind decode performed for one of the search spaces, there exists only one resource allocation and one blind decode (or a small number of resource allocations and a small number of blind decodes) that the receiving device needs to perform for the other search space to attempt a soft combination of control transmissions. For example, a transmitting device may follow a deterministic rule to identify a resource allocation for retransmission of a control message (e.g., if a last transmission was made using CCE n, then a first or next retransmission may be made using CCE f(n), where f(.) is a deterministic function known to both the transmitting device and the receiving device).

With reference to FIG. 3, it was indicated that a receiving device may derive, from a set of bits that differ between a first control message and a second control message, a number of CRC bits that differ for the first control message and the second control message. In some examples, the number of CRC bits that differ may be derived based on CRC encoding being a linear transform. For example, given a first control message, x, having CRC(x), and a second control message, y, having CRC(y), the CRC for an exclusive or (XOR) of x and y is:

$$CRC(x \text{ XOR } y) = CRC(x) \text{XOR } CRC(y)$$

If the bits of x and y that differ are known, then x XOR y may be determined regardless of whether the values of the differing bits are known, and CRC(x XOR y) indicates which bits differ between CRC(x) and CRC(y).

Figure 7:
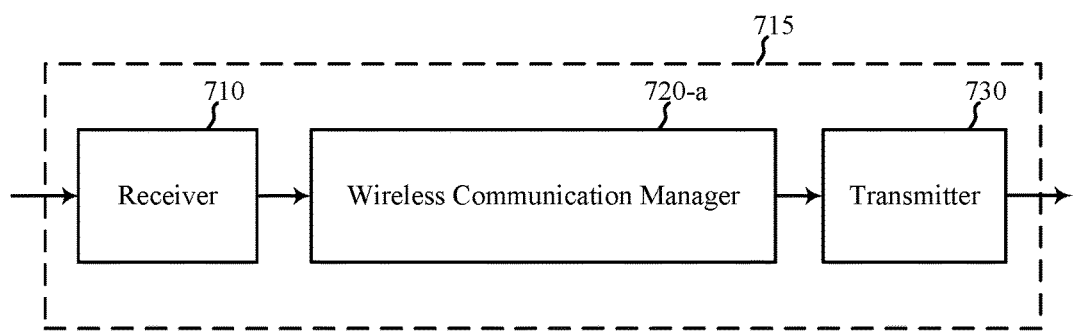
FIG. 7 shows a block diagram of an apparatus for wireless communication, in accordance with one or more aspects of the present disclosure.

FIG. 7 shows a block diagram 700 of an apparatus 715 for wireless communication, in accordance with one or more aspects of the present disclosure. The apparatus 715 may be an example of aspects of a UE 115 described with reference to FIG. 1 or 11. The apparatus 715 may include a receiver 710, a wireless communication manager 720-*a*, and a transmitter 730. The apparatus 715 may also include a processor. Each of these components may be in communication with each other.

The receiver 710 may receive information such as packets, user data, or control transmissions associated with various information channels (e.g., control channels or data channels). Received information may be passed to other components of the apparatus 715, including the wireless communication manager 720-*a*. The receiver 710 may be an example of aspects of the transceiver(s) 1130 described with reference to FIG. 11. The receiver 710 may include or be associated with a single antenna or a plurality of antennas.

The wireless communication manager 720-*a* may be used to manage one or more aspects of wireless communication for the apparatus 715. In some examples, part of the wireless communication manager 720-*a* may be incorporated into or shared with the receiver 710 or the transmitter 730. The wireless communication manager 720-*a* may be an example of aspects of the wireless communication manager 720 described with reference to FIG. 1 or 11. The wireless communication manager 720-*a* may be used to soft combine and decode control transmissions received via the receiver 710.

The transmitter 730 may transmit signals received from other components of the apparatus 715, including the wireless communication manager 720-*a*. In some examples, the transmitter 730 may be collocated with the receiver 710 in a transceiver. The transmitter 730 may be an example of aspects of the transceiver(s) 1130 described with reference to FIG. 11. The transmitter 730 may include or be associated with a single antenna or a plurality of antennas.

Figure 8:
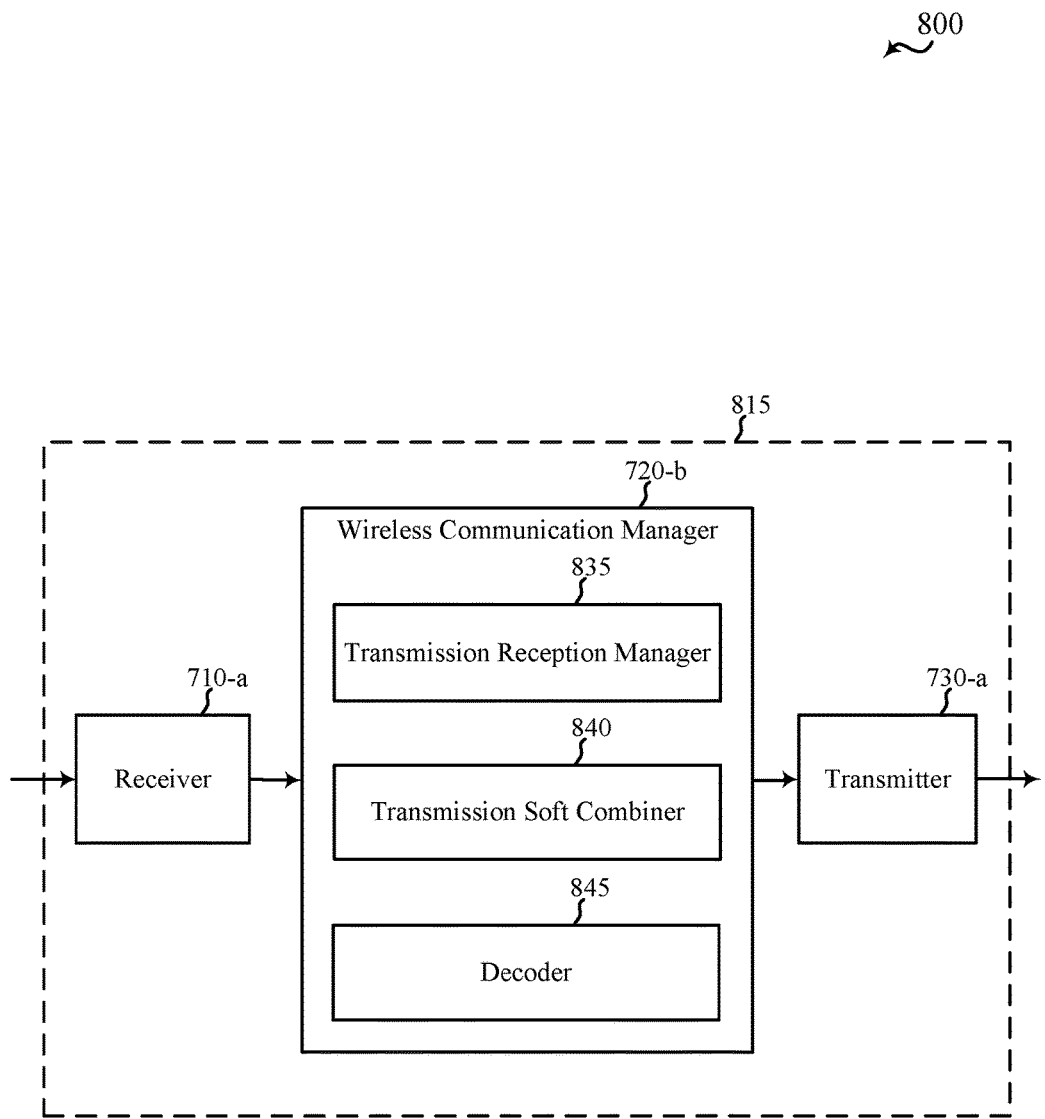
FIG. 8 shows a block diagram of an apparatus for wireless communication, in accordance with one or more aspects of the present disclosure.

FIG. 8 shows a block diagram 800 of an apparatus 815 for wireless communication, in accordance with one or more aspects of the present disclosure. The apparatus 815 may be an example of aspects of a UE 115 described with reference to FIG. 1 or 11, or an example of aspects of the apparatus 715 described with reference to FIG. 7. The apparatus 815 may include a receiver 710-*a*, a wireless communication manager 720-*b*, and a transmitter 730-*a*. The apparatus 815 may also include a processor. Each of these components may be in communication with each other.

The receiver 710-*a* may receive information that may be passed to other components of the apparatus 815, including the wireless communication manager 720-*b*. In some examples, the receiver 710-*a* may perform functions described with reference to the receiver 710 described with reference to FIG. 7. In some examples, the receiver 710-*a* may be an example of aspects of the transceiver(s) 1130 described with reference to FIG. 11. The receiver 710-*a* may include or be associated with a single antenna or a plurality of antennas.

The wireless communication manager 720-*b* may be an example of aspects of the wireless communication manager 720 described with reference to FIG. 1, 7, or 11. The wireless communication manager 720-*b* may include a transmission reception manager 835, a transmission soft combiner 840, and a decoder 845.

The transmission reception manager 835 may be used to buffer a first set of coded bits including a first control message. The first control message may have a plurality of fields. The fields may include, for example, one or more fields having bits that are unchanged from the first control message to the second control message, one or more fields having bits that change deterministically from the first control message to the second control message, one or more fields having bits that change non-deterministically from the first control message to the second control message, or at least one field including a number of CRC bits. The transmission reception manager 835 may also be used to buffer a second set of coded bits including a second control message. The second control message may also have the plurality of fields. The second control message may be a retransmission (or partial retransmission) of the first control message.

The transmission soft combiner 840 may be used to soft combine at least a first subset of the first set of coded bits and a second subset of the second set of coded bits in a combined set of coded bits.

The decoder 845 may be used to decode the first control message or the second control message based at least in part on the combined set of coded bits.

The transmitter 730-*a* may transmit signals received from other components of the apparatus 815, including the wireless communication manager 720-*b*. In some examples, the transmitter 730-*a* may perform functions described with reference to the transmitter 730 described with reference to FIG. 7. In some examples, the transmitter 730-*a* may be collocated with the receiver 710-*a* in a transceiver. In some examples, the transmitter 730-*a* may be an example of aspects of the transceiver(s) 1130 described with reference to FIG. 11. The transmitter 730-*a* may include or be associated with a single antenna or a plurality of antennas.

In some examples, the first set of coded bits buffered by the transmission reception manager 835 may correspond to a first set of LLRs calculated for a first control transmission, and the second set of coded bits may correspond to a second set of LLRs calculated for a second control transmission. In some examples, each of the first set of coded bits and the second set of coded bits may be encoded based at least in part on a convolutional coding of information bits or a polar coding of information bits.

Figure 9:
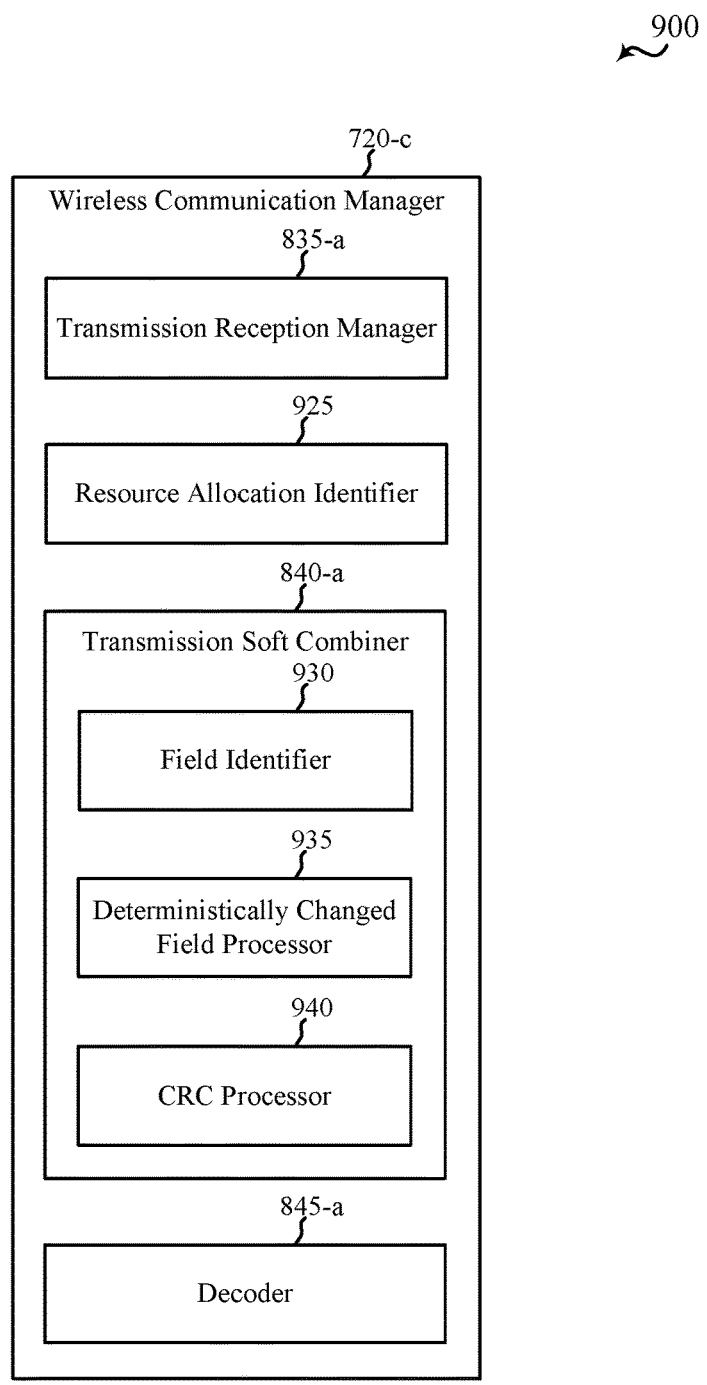
FIG. 9 shows a block diagram of a wireless communication manager, in accordance with one or more aspects of the present disclosure.

FIG. 9 shows a block diagram 900 of a wireless communication manager 720-*c*, in accordance with one or more aspects of the present disclosure. The wireless communication manager 720-*c* may be an example of aspects of the wireless communication manager 720 described with reference to FIG. 1, 7, 8, or 11.

The wireless communication manager 720-*c* may include a transmission reception manager 835-*a*, a resource allocation identifier 925, a transmission soft combiner 840-*a*, and a decoder 845-*a*. The transmission soft combiner 840-*a* my include a field identifier 930, a deterministically changed field processor 935, and a CRC processor 940. Each of these components may communicate, directly or indirectly, with one another (e.g., via one or more buses). The transmission reception manager 835-*a*, transmission soft combiner 840-*a*, and decoder 845-*a* may be examples of aspects of the transmission reception manager 835, the transmission soft combiner 840, and the decoder 845, respectively, described with reference to FIG. 8.

The transmission reception manager 835-*a* may be used to buffer a first set of coded bits including a first control message. The first control message may have a plurality of fields. The fields may include, for example, one or more fields having bits that are unchanged from the first control message to the second control message, one or more fields having bits that change deterministically from the first control message to the second control message, one or more fields having bits that change non-deterministically from the first control message to the second control message, or at least one field including a number of CRC bits. In some examples, the transmission reception manager 835-*a* may buffer a search space of a control region transmitted during a first slot or TTI, and the buffering of the search space may include the buffering of the first set of coded bits.

The transmission reception manager 835-*a* may also be used to buffer a second set of coded bits including a second control message. The second control message may also have the plurality of fields. The second control message may be a retransmission (or partial retransmission) of the first control message.

The resource allocation identifier 925 may be used, in some examples, to identify a first resource allocation associated with the second set of coded bits, or to identify a second resource allocation associated with the first set of coded bits. The second resource allocation may be identified based at least in part on the first resource allocation associated with the second set of coded bits. In other examples, the resource allocation identifier 925 may be used to identify a first resource allocation associated with the first set of coded bits, and to identify a second resource allocation associated with the second set of coded bits based at least in part on the first resource allocation associated with the first set of coded bits.

The transmission soft combiner 840-*a* may be used to soft combine at least a first subset of the first set of coded bits and a second subset of the second set of coded bits in a combined set of coded bits.

The decoder 845-*a* may be used to decode the first control message or the second control message based at least in part on the combined set of coded bits.

The field identifier 930 may be used to identify, within the plurality of fields, at least one field having bits that are unchanged from the first control message to the second control message, at least one field having a set of bits that change deterministically from the first control message to the second control message, at least one field having a set of bits that change non-deterministically from the first control message to the second control message, or at least one field including a number of CRC bits.

The deterministically changed field processor 935 may be used for a field having a set of bits that change deterministically from the first control message to the second control message, to derive, from the set of bits, a subset of coded bits that differ between the first set of coded bits and the second set of coded bits. The deterministically changed field processor 935 may also be used to modify the subset of coded bits in at least one of the first set of coded bits or the second set of coded bits, to place the subset of coded bits in a same state in the first set of coded bits and the second set of coded bits. The transmission soft combiner 840-a may then perform the soft combining.

In some examples, the transmission reception manager 835-a may be used to generate sequential ranks of the first set of coded bits and the second set of coded bits, with each rank of coded bits being generated based on a different subset of information bits in the first control message or the second control message, and with each lower rank of coded bits being generated based on a subset of the information bits used to generate a next higher rank of coded bits. In these examples, the transmission soft combiner 840-a may perform the soft combining beginning with a lowest rank. In some examples, the soft combining may be performed for multiple ranks, in sequential order, beginning with the lowest rank and proceeding toward a highest rank. In some examples, the transmission soft combiner 840-a may refrain from soft combining a subset of the sequential ranks including at least one sequentially highest rank (e.g., a highest rank, or a highest rank and a next highest rank, etc.). In some examples, the refraining may be based at least in part on identifying at least one field that has a set of bits that change non-deterministically from the first control message to the second control message (and then ceasing the soft combining without combining the bits of the identified field(s)).

The CRC processor 940 may be used to identify a set of bits that differ between the first control message and the second control message, and to derive, from the set of bits that differ between the first control message and the second control message, a number of CRC bits that differ for the first control message and the second control message. The CRC processor 940 may also be used to identify, based at least in part on the number of CRC bits that differ for the first control message and the second control message, a subset of coded bits that differ between the first set of coded bits and the second set of coded bits. The CRC processor 940 may further be used to modify the subset of coded bits in at least one of the first set of coded bits or the second set of coded bits, to place the subset of coded bits in a same state in the first set of coded bits and the second set of coded bits.

Figure 10:
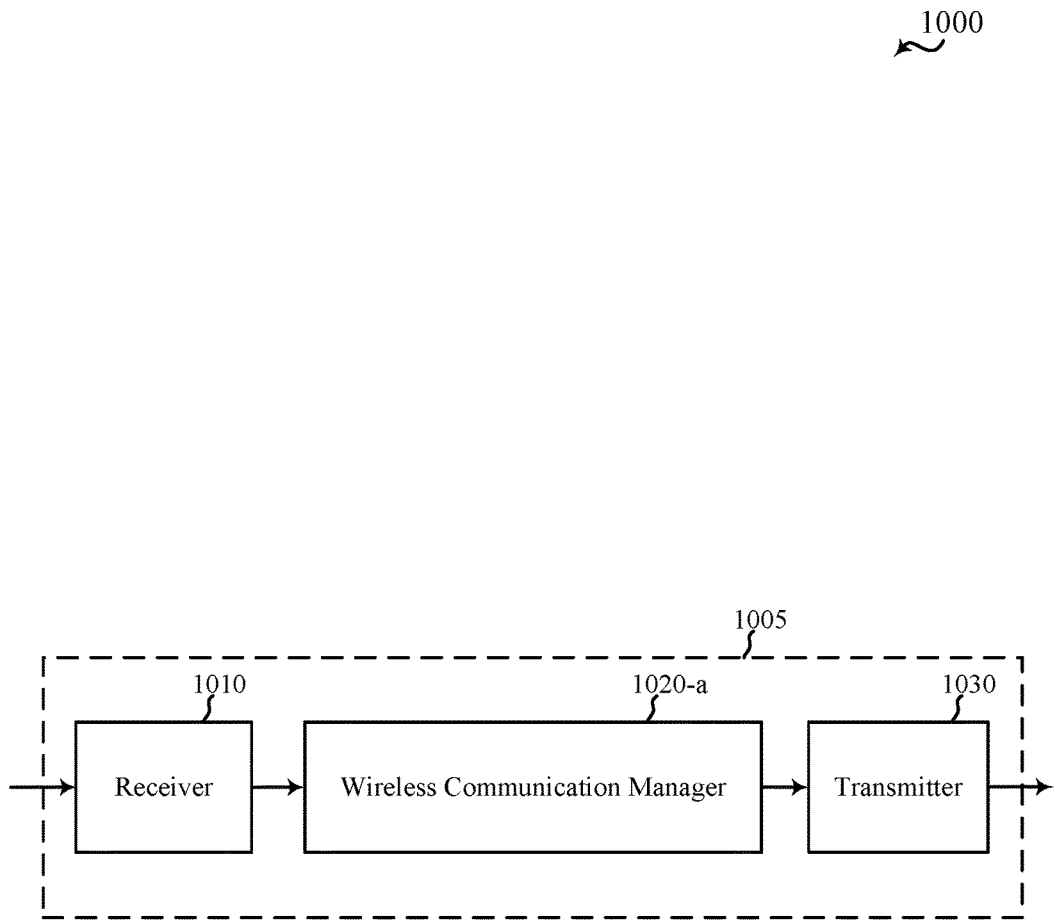
FIG. 10 shows a block diagram of an apparatus for wireless communication, in accordance with one or more aspects of the present disclosure.

FIG. 10 shows a block diagram 1000 of an apparatus 1005 for wireless communication, in accordance with one or more aspects of the present disclosure. The apparatus 1005 may be an example of aspects of a network access device 105 described with reference to FIG. 1 or 12. The apparatus 1005 may include a receiver 1010, a wireless communication manager 1020-a, and a transmitter 1030. The apparatus 1005 may also include a processor. Each of these components may be in communication with each other.

The receiver 1010 may receive information such as packets, user data, or control transmissions associated with various information channels (e.g., control channels or data channels). Received information may be passed to other components of the apparatus 1005, including the wireless communication manager 1020-a. The receiver 1010 may be an example of aspects of the transceiver(s) 1250 described with reference to FIG. 12. The receiver 1010 may include or be associated with a single antenna or a plurality of antennas.

The wireless communication manager 1020-a may be used to manage one or more aspects of wireless communication for the apparatus 1005. In some examples, part of the wireless communication manager 1020-a may be incorporated into or shared with the receiver 1010 or the transmitter 1030. The wireless communication manager 1020-a may be an example of aspects of the wireless communication manager 1020 described with reference to FIG. 1 or 12. The wireless communication manager 1020-a may be used to transmit and retransmit data and/or control messages to UEs. The wireless communication manager 1020-a may also be used to encode control transmissions in a manner that enables UEs to decode and soft combine selected fields of the control transmissions.

The transmitter 1030 may transmit signals received from other components of the apparatus 1005, including the wireless communication manager 1020-a. In some examples, the transmitter 1030 may be collocated with the receiver 1010 in a transceiver. The transmitter 1030 may be an example of aspects of the transceiver(s) 1250 described with reference to FIG. 12. The transmitter 1030 may include or be associated with a single antenna or a plurality of antennas.

Figure 11:
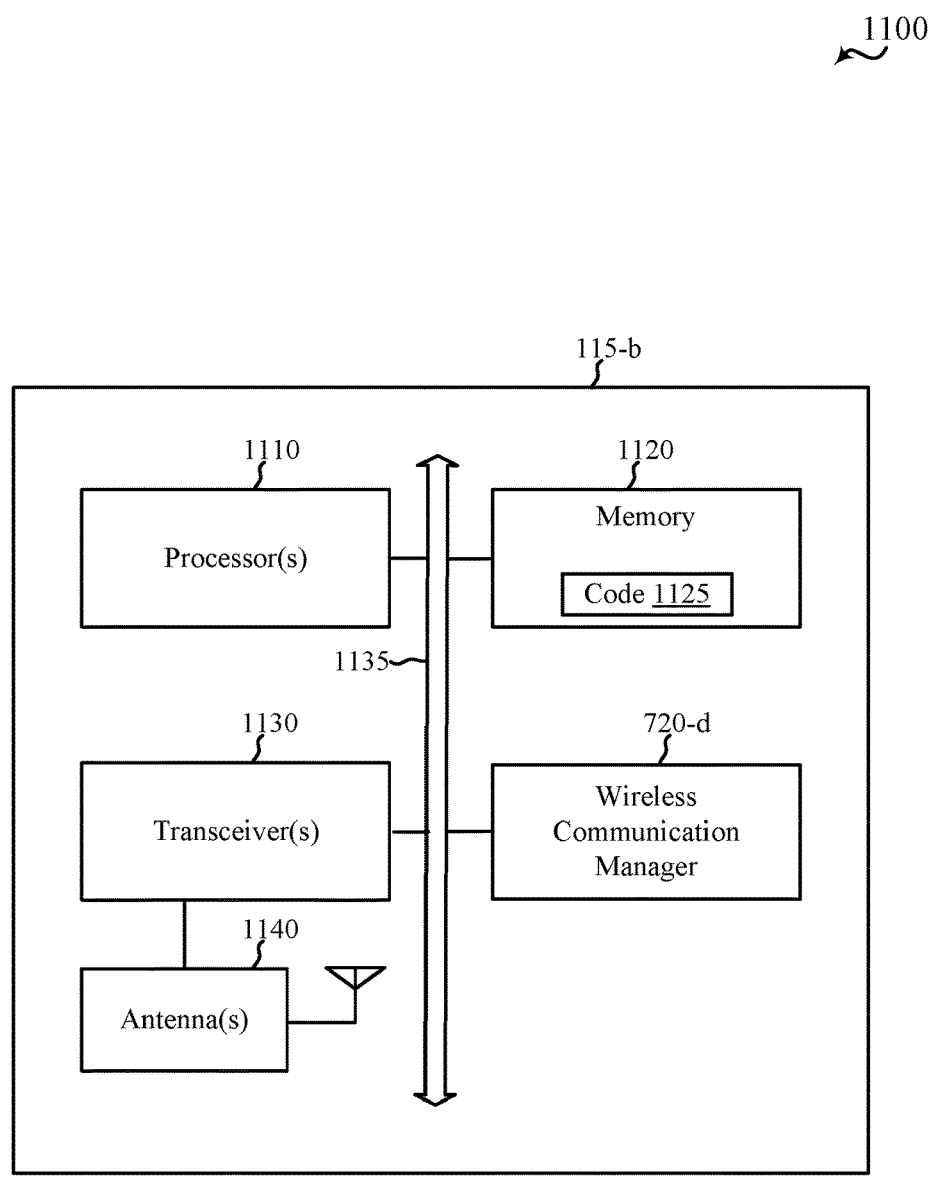
FIG. 11 shows a block diagram of a UE for use in wireless communication, in accordance with one or more aspects of the present disclosure.

FIG. 11 shows a block diagram 1100 of a UE 115-b for use in wireless communication, in accordance with one or more aspects of the present disclosure. The UE 115-b may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-b may, in some examples, have an internal power supply (not shown), such as a small battery, to facilitate mobile operation. In some examples, the UE 115-b may be an example of aspects of one or more of the UEs 115 described with reference to FIG. 1, or aspects of the apparatus 715 or 815 described with reference to FIG. 7 or 8. The UE 115-b may be configured to implement at least some of the UE or apparatus techniques and functions described with reference to FIG. 1, 2, 3, 4, 5, 6, 7, 8, or 9.

The UE 115-b may include a processor 1110, a memory 1120, at least one transceiver (represented by transceiver(s) 1130), at least one antenna (represented by antenna(s) 1140), or a wireless communication manager 720-d. Each of these components may be in communication with each other, directly or indirectly, over one or more buses 1135.

The memory 1120 may include random access memory (RAM) or read-only memory (ROM). The memory 1120 may store computer-readable, computer-executable code 1125 containing instructions that are configured to, when executed, cause the processor 1110 to perform various functions described herein related to wireless communication, including, for example, soft combining control transmissions. Alternatively, the computer-executable code 1125 may not be directly executable by the processor 1110 but be configured to cause the UE 115-b (e.g., when compiled and executed) to perform various of the functions described herein.

The processor 1110 may include an intelligent hardware device, e.g., a central processing unit (CPU), a microcontroller, an ASIC, etc. The processor 1110 may process information received through the transceiver(s) 1130 or information to be sent to the transceiver(s) 1130 for transmission through the antenna(s) 1140. The processor 1110 may handle, alone or in connection with the wireless communication manager 720-*d*, various aspects of communicating over (or managing communications over) one or more radio frequency spectrum bands.

The transceiver(s) 1130 may include a modem configured to modulate packets and provide the modulated packets to the antenna(s) 1140 for transmission, and to demodulate packets received from the antenna(s) 1140. The transceiver(s) 1130 may, in some examples, be implemented as one or more transmitters and one or more separate receivers. The transceiver(s) 1130 may support communications in one or more radio frequency spectrum bands. The transceiver(s) 1130 may be configured to communicate bi-directionally, via the antenna(s) 1140, with one or more of the network access devices 105 described with reference to FIG. 1, or one or more of the apparatuses 715 or 815 described with reference to FIG. 7 or 8. While the UE 115-*b* may include a single antenna, there may be examples in which the UE 115-*b* may include multiple antennas 1140.

The wireless communication manager 720-*d* may be configured to perform or control some or all of the UE or apparatus techniques or functions described with reference to FIG. 1, 2, 3, 4, 5, 6, 7, 8, or 9 related to wireless communication over one or more radio frequency spectrum bands. The wireless communication manager 720-*d*, or portions of it, may include a processor, or some or all of the functions of the wireless communication manager 720-*d* may be performed by the processor 1110 or in connection with the processor 1110. In some examples, the wireless communication manager 720-*d* may be an example of the wireless communication manager 720 described with reference to FIG. 1, 7, 8, or 9.

Figure 12:
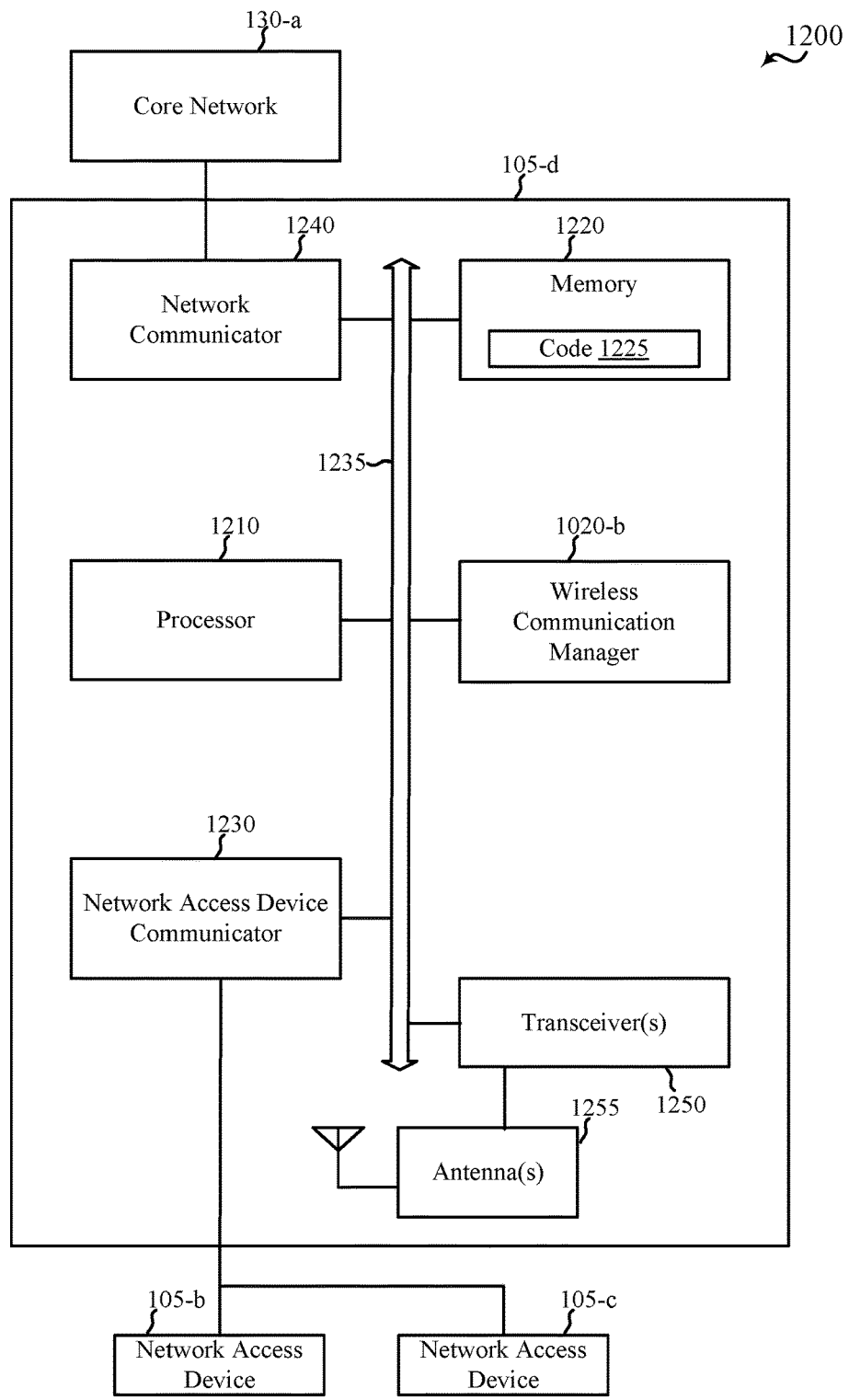
FIG. 12 shows a block diagram of a network access device for use in wireless communication, in accordance with one or more aspects of the present disclosure.

FIG. 12 shows a block diagram 1200 of a network access device 105-*d* for use in wireless communication, in accordance with one or more aspects of the present disclosure. In some examples, the network access device 105-*d* may be an example of one or more aspects of a network access device 105 (e.g., a gNB, an eNB, an ANC, a radio head, or a base station) described with reference to FIG. 1, or aspects of the apparatus 1005 described with reference to FIG. 10. The network access device 105-*d* may be configured to implement or facilitate at least some of the network access device techniques and functions described with reference to FIG. 1, 2, 3, 4, 5, 6, or 10.

The network access device 105-*d* may include a processor 1210, a memory 1220, at least one transceiver (represented by transceiver(s) 1250), at least one antenna (represented by antenna(s) 1255), or a wireless communication manager 1020-*b*. The network access device 105-*d* may also include one or more of a network access device communicator 1230 or a network communicator 1240. Each of these components may be in communication with each other, directly or indirectly, over one or more buses 1235.

The memory 1220 may include RAM or ROM. The memory 1220 may store computer-readable, computer-executable code 1225 containing instructions that are configured to, when executed, cause the processor 1210 to perform various functions described herein related to wireless communication, including, for example, encoding and transmitting (and in some cases, retransmitting) control transmissions. Alternatively, the computer-executable code 1225 may not be directly executable by the processor 1210 but be configured to cause the network access device 105-*d* (e.g., when compiled and executed) to perform various of the functions described herein.

The processor 1210 may include an intelligent hardware device, e.g., a CPU, a microcontroller, an ASIC, etc. The processor 1210 may process information received through the transceiver(s) 1250, the network access device communicator 1230, or the network communicator 1240. The processor 1210 may also process information to be sent to the transceiver(s) 1250 for transmission through the antenna(s) 1255, to the network access device communicator 1230, for transmission to one or more other network access devices (e.g., network access device 105-*b* and network access device 105-*c*), or to the network communicator 1240 for transmission to a core network 130-*a*, which may be an example of one or more aspects of the core network 130 described with reference to FIG. 1. The processor 1210 may handle, alone or in connection with the wireless communication manager 1020-*b*, various aspects of communicating over (or managing communications over) one or more radio frequency spectrum bands.

The transceiver(s) 1250 may include a modem configured to modulate packets and provide the modulated packets to the antenna(s) 1255 for transmission, and to demodulate packets received from the antenna(s) 1255. The transceiver(s) 1250 may, in some examples, be implemented as one or more transmitters and one or more separate receivers. The transceiver(s) 1250 may support communications in one or more radio frequency spectrum bands. The transceiver(s) 1250 may be configured to communicate bi-directionally, via the antenna(s) 1255, with one or more UEs or apparatuses, such as one or more of the UEs 115 described with reference to FIG. 1 or 11, or one or more of the apparatuses 715 or 815 described with reference to FIG. 7 or 8. The network access device 105-*d* may, for example, include multiple antennas 1255 (e.g., an antenna array). The network access device 105-*d* may communicate with the core network 130-*a* through the network communicator 1240. The network access device 105-*d* may also communicate with other network access devices, such as the network access device 105-*b* and the network access device 105-*c*, using the network access device communicator 1230.

The wireless communication manager 1020-*b* may be configured to perform or control some or all of the techniques or functions described with reference to FIG. 1, 2, 3, 4, 5, 6, or 10 related to wireless communication over one or more radio frequency spectrum bands. The wireless communication manager 1020-*b*, or portions of it, may include a processor, or some or all of the functions of the wireless communication manager 1020-*b* may be performed by the processor 1210 or in connection with the processor 1210. In some examples, the wireless communication manager 1020-*b* may be an example of the wireless communication manager 1020 described with reference to FIG. 1 or 10.

Figure 13:
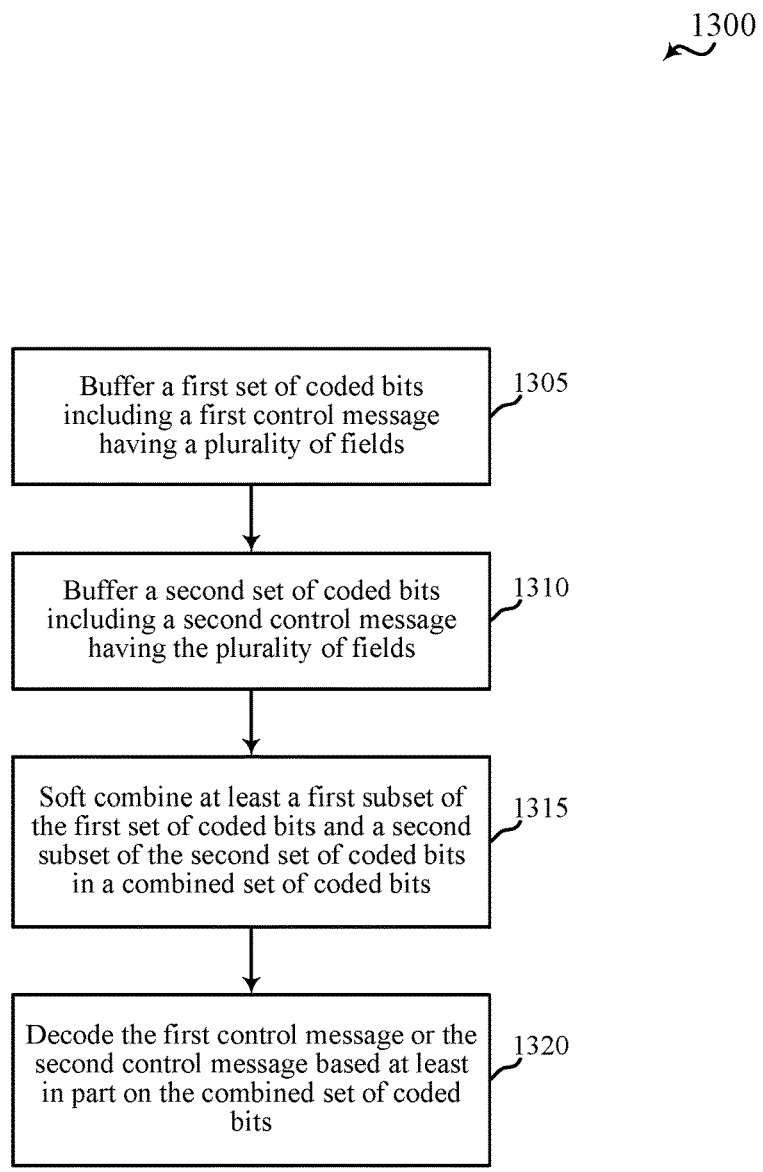
FIG. 13 is a flow chart illustrating an example of a method for wireless communication at a receiving device, in accordance with one or more aspects of the present disclosure.

FIG. 13 is a flow chart illustrating an example of a method 1300 for wireless communication at a receiving device, in accordance with one or more aspects of the present disclosure. For clarity, the method 1300 is described below with reference to aspects of a UE 115 described with reference to FIG. 1 or 11, aspects of the apparatus 715 or 815 described with reference to FIG. 7 or 8, or aspects of the wireless communication manager 720 described with reference to FIG. 1, 7, 8, 9, or 11. In some examples, a receiving device may execute one or more sets of codes to control the functional elements of the receiving device to perform the functions described below. Additionally or alternatively, the receiving device may perform one or more of the functions described below using special-purpose hardware.

At block 1305, the method 1300 may include buffering a first set of coded bits including a first control message. The first control message may have a plurality of fields. The fields may include, for example, one or more fields having bits that are unchanged from the first control message to a second control message, one or more fields having bits that change deterministically from the first control message to a second control message, one or more fields having bits that change non-deterministically from the first control message to a second control message, or at least one field including a number of CRC bits. The operation(s) at block 1305 may be performed using the wireless communication manager 720 described with reference to FIG. 1, 7, 8, 9, or 11, or the transmission reception manager 835 described with reference to FIG. 8 or 9.

At block 1310, the method 1300 may include buffering a second set of coded bits including a second control message. The second control message may also have the plurality of fields. The second control message may be a retransmission (or partial retransmission) of the first control message. The operation(s) at block 1310 may be performed using the wireless communication manager 720 described with reference to FIG. 1, 7, 8, 9, or 11, or the transmission reception manager 835 described with reference to FIG. 8 or 9.

At block 1315, the method 1300 may include soft combining at least a first subset of the first set of coded bits and a second subset of the second set of coded bits in a combined set of coded bits. The operation(s) at block 1315 may be performed using the wireless communication manager 720 described with reference to FIG. 1, 7, 8, 9, or 11, or the transmission soft combiner 840 described with reference to FIG. 8 or 9.

At block 1320, the method 1300 may include decoding the first control message or the second control message based at least in part on the combined set of coded bits. The operation(s) at block 1320 may be performed using the wireless communication manager 720 described with reference to FIG. 1, 7, 8, 9, or 11, or the decoder 845 described with reference to FIG. 8 or 9.

In some examples, the first set of coded bits may correspond to a first set of LLRs calculated for a first control transmission, and the second set of coded bits may correspond to a second set of LLRs calculated for a second control transmission. In some examples, each of the first set of coded bits and the second set of coded bits may be encoded based at least in part on a convolutional coding of information bits or a polar coding of information bits.

Figure 14:
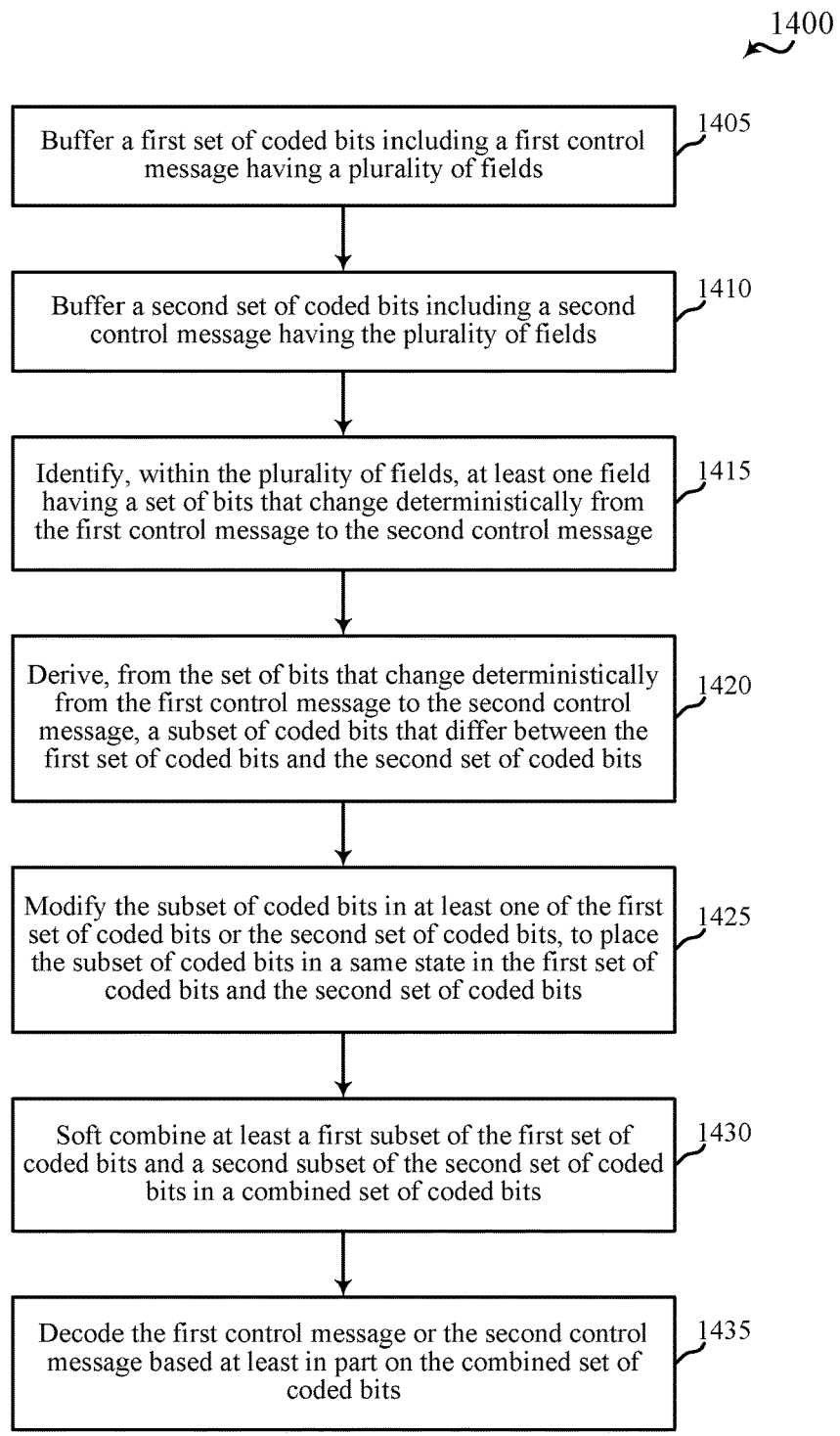
FIG. 14 is a flow chart illustrating an example of a method for wireless communication at a receiving device, in accordance with one or more aspects of the present disclosure.

FIG. 14 is a flow chart illustrating an example of a method 1400 for wireless communication at a receiving device, in accordance with one or more aspects of the present disclosure. For clarity, the method 1400 is described below with reference to aspects of a UE 115 described with reference to FIG. 1 or 11, aspects of the apparatus 715 or 815 described with reference to FIG. 7 or 8, or aspects of the wireless communication manager 720 described with reference to FIG. 1, 7, 8, 9, or 11. In some examples, a receiving device may execute one or more sets of codes to control the functional elements of the receiving device to perform the functions described below. Additionally or alternatively, the receiving device may perform one or more of the functions described below using special-purpose hardware.

At block 1405, the method 1400 may include buffering a first set of coded bits including a first control message. The first control message may have a plurality of fields. The fields may include, for example, one or more fields having bits that are unchanged from the first control message to a second control message, one or more fields having bits that change deterministically from the first control message to a second control message, one or more fields having bits that change non-deterministically from the first control message to a second control message, or at least one field including a number of CRC bits. The operation(s) at block 1405 may be performed using the wireless communication manager 720 described with reference to FIG. 1, 7, 8, 9, or 11, or the transmission reception manager 835 described with reference to FIG. 8 or 9.

At block 1410, the method 1400 may include buffering a second set of coded bits including a second control message. The second control message may also have the plurality of fields. The second control message may be a retransmission (or partial retransmission) of the first control message. The operation(s) at block 1410 may be performed using the wireless communication manager 720 described with reference to FIG. 1, 7, 8, 9, or 11, or the transmission reception manager 835 described with reference to FIG. 8 or 9.

At block 1415, the method 1400 may include identifying, within the plurality of fields, at least one field having a set of bits that change deterministically from the first control message to the second control message. The operation(s) at block 1415 may be performed using the wireless communication manager 720 described with reference to FIG. 1, 7, 8, 9, or 11, or the field identifier 930 described with reference to FIG. 9.

At block 1420, the method 1400 may include deriving, from the set of bits that change deterministically from the first control message to the second control message, a subset of coded bits that differ between the first set of coded bits and the second set of coded bits. The operation(s) at block 1420 may be performed using the wireless communication manager 720 described with reference to FIG. 1, 7, 8, 9, or 11, or the deterministically changed field processor 935 described with reference to FIG. 9.

At block 1425, the method 1400 may include modifying the subset of coded bits in at least one of the first set of coded bits or the second set of coded bits, to place the subset of coded bits in a same state in the first set of coded bits and the second set of coded bits. The operation(s) at block 1425 may be performed using the wireless communication manager 720 described with reference to FIG. 1, 7, 8, 9, or 11, or the deterministically changed field processor 935 described with reference to FIG. 9.

At block 1430, the method 1400 may include soft combining at least a first subset of the first set of coded bits and a second subset of the second set of coded bits in a combined set of coded bits. The operation(s) at block 1430 may be performed using the wireless communication manager 720 described with reference to FIG. 1, 7, 8, 9, or 11, or the transmission soft combiner 840 described with reference to FIG. 8 or 9.

At block 1435, the method 1400 may include decoding the first control message or the second control message based at least in part on the combined set of coded bits. The operation(s) at block 1435 may be performed using the wireless communication manager 720 described with reference to FIG. 1, 7, 8, 9, or 11, or the decoder 845 described with reference to FIG. 8 or 9.

In some examples, the first set of coded bits may correspond to a first set of LLRs calculated for a first control transmission, and the second set of coded bits may correspond to a second set of LLRs calculated for a second control transmission. In some examples, each of the first set of coded bits and the second set of coded bits may be encoded based at least in part on a convolutional coding of information bits or a polar coding of information bits.

Figure 15:
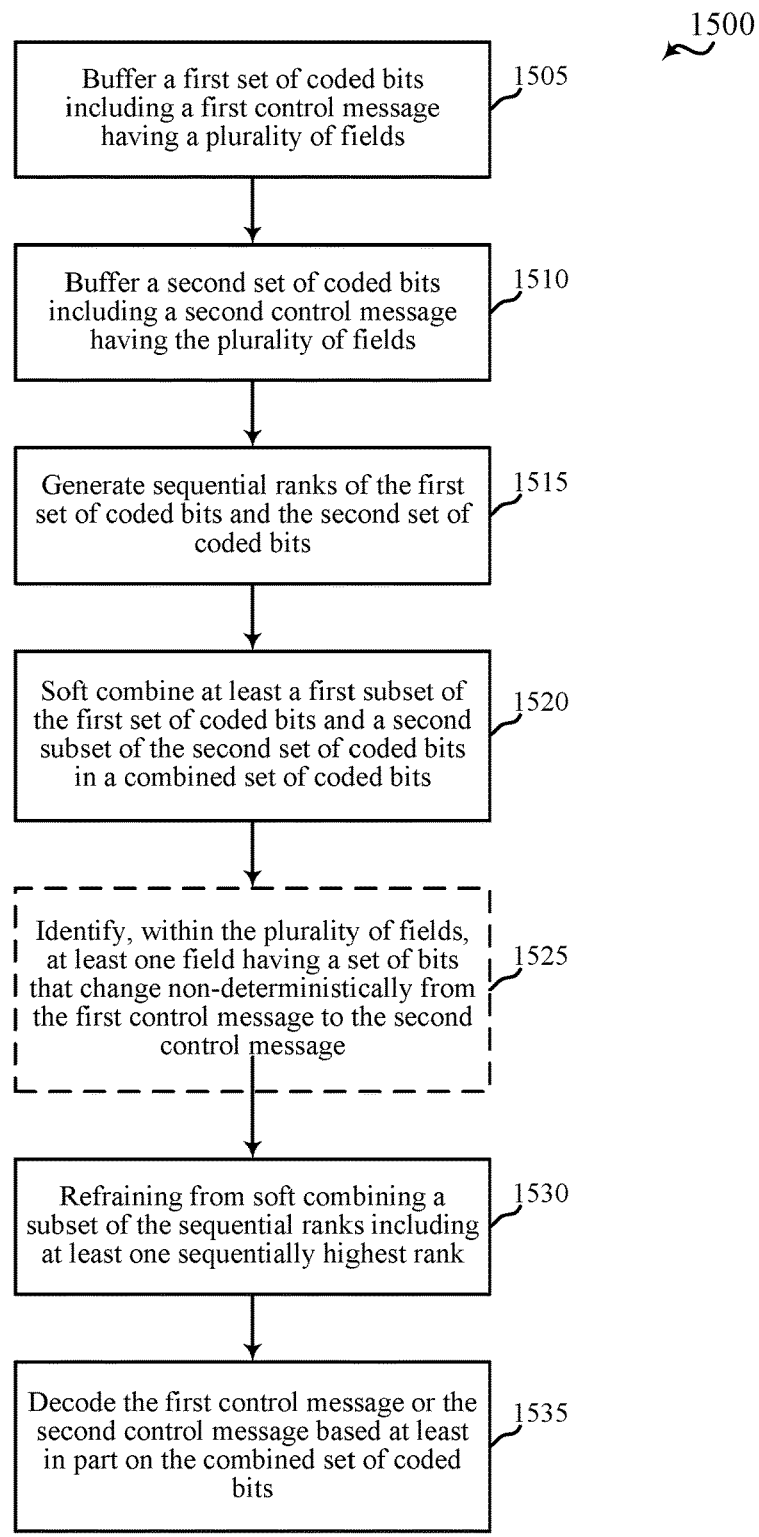
FIG. 15 is a flow chart illustrating an example of a method for wireless communication at a receiving device, in accordance with one or more aspects of the present disclosure.

FIG. 15 is a flow chart illustrating an example of a method 1500 for wireless communication at a receiving device, in accordance with one or more aspects of the present disclosure. For clarity, the method 1500 is described below with reference to aspects of a UE 115 described with reference to FIG. 1 or 11, aspects of the apparatus 715 or 815 described with reference to FIG. 7 or 8, or aspects of the wireless communication manager 720 described with reference to FIG. 1, 7, 8, 9, or 11. In some examples, a receiving device may execute one or more sets of codes to control the functional elements of the receiving device to perform the functions described below. Additionally or alternatively, the receiving device may perform one or more of the functions described below using special-purpose hardware.

At block 1505, the method 1500 may include buffering a first set of coded bits including a first control message. The first control message may have a plurality of fields. The fields may include, for example, one or more fields having bits that are unchanged from the first control message to a second control message, one or more fields having bits that change deterministically from the first control message to a second control message, one or more fields having bits that change non-deterministically from the first control message to a second control message, or at least one field including a number of CRC bits. The operation(s) at block 1505 may be performed using the wireless communication manager 720 described with reference to FIG. 1, 7, 8, 9, or 11, or the transmission reception manager 835 described with reference to FIG. 8 or 9.

At block 1510, the method 1300 may include buffering a second set of coded bits including a second control message. The second control message may also have the plurality of fields. The second control message may be a retransmission (or partial retransmission) of the first control message. The operation(s) at block 1510 may be performed using the wireless communication manager 720 described with reference to FIG. 1, 7, 8, 9, or 11, or the transmission reception manager 835 described with reference to FIG. 8 or 9.

At block 1515, the method 1500 may include generating sequential ranks of the first set of coded bits and the second set of coded bits. Each rank of the coded bits may be generated based on a different subset of information bits in the first control message or the second control message, and each lower rank of coded bits may be generated based on a subset of the information bits used to generate a next higher rank of coded bits. The operation(s) at block 1515 may be performed using the wireless communication manager 720 described with reference to FIG. 1, 7, 8, 9, or 11, or the transmission reception manager 835 described with reference to FIG. 8 or 9.

At block 1520, the method 1500 may include soft combining at least a first subset of the first set of coded bits and a second subset of the second set of coded bits in a combined set of coded bits. In some examples, the soft combining may be performed for the sequential ranks generated at block 1515, beginning with a lowest rank. In some examples, the soft combining may be performed for multiple ranks, in sequential order, beginning with the highest rank and proceeding toward a lowest rank. In some examples, the operations at block 1520 may include the operations at blocks 1415, 1410, and 1425 of the method 1400 described with reference to FIG. 14. The operation(s) at block 1520 may be performed using the wireless communication manager 720 described with reference to FIG. 1, 7, 8, 9, or 11, or the transmission soft combiner 840 described with reference to FIG. 8 or 9.

At block 1525, the method 1500 may optionally include identifying, within the plurality of fields, at least one field having a set of bits that change non-deterministically from the first control message to the second control message. In some examples, the operation(s) at block 1525 may be performed at least partly before and/or during the operation(s) at block 1520, and may cause the method 1500 to cease the soft combining performed at block 1520 and jump to block 1530. The operation(s) at block 1525 may be performed using the wireless communication manager 720 described with reference to FIG. 1, 7, 8, 9, or 11, or the field identifier 930 described with reference to FIG. 9.

At block 1530, the method 1500 may include refraining from soft combining a subset of the sequential ranks including at least one sequentially highest rank (e.g., a highest rank, or a highest rank and a next highest rank, etc.). In some examples, the refraining may be based at least in part on identifying the at least one field that has a set of bits that change non-deterministically from the first control message to the second control message (and then ceasing the soft combining without combining the bits of the identified field(s)). The operation(s) at block 1530 may be performed using the wireless communication manager 720 described with reference to FIG. 1, 7, 8, 9, or 11, or the transmission soft combiner 840 described with reference to FIG. 8 or 9.

At block 1535, the method 1500 may include decoding the first control message or the second control message based at least in part on the combined set of coded bits. The operation(s) at block 1535 may be performed using the wireless communication manager 720 described with reference to FIG. 1, 7, 8, 9, or 11, or the decoder 845 described with reference to FIG. 8 or 9.

In some examples, the first set of coded bits may correspond to a first set of LLRs calculated for a first control transmission, and the second set of coded bits may correspond to a second set of LLRs calculated for a second control transmission. In some examples, each of the first set of coded bits and the second set of coded bits may be encoded based at least in part on a convolutional coding of information bits or a polar coding of information bits.

Figure 16:
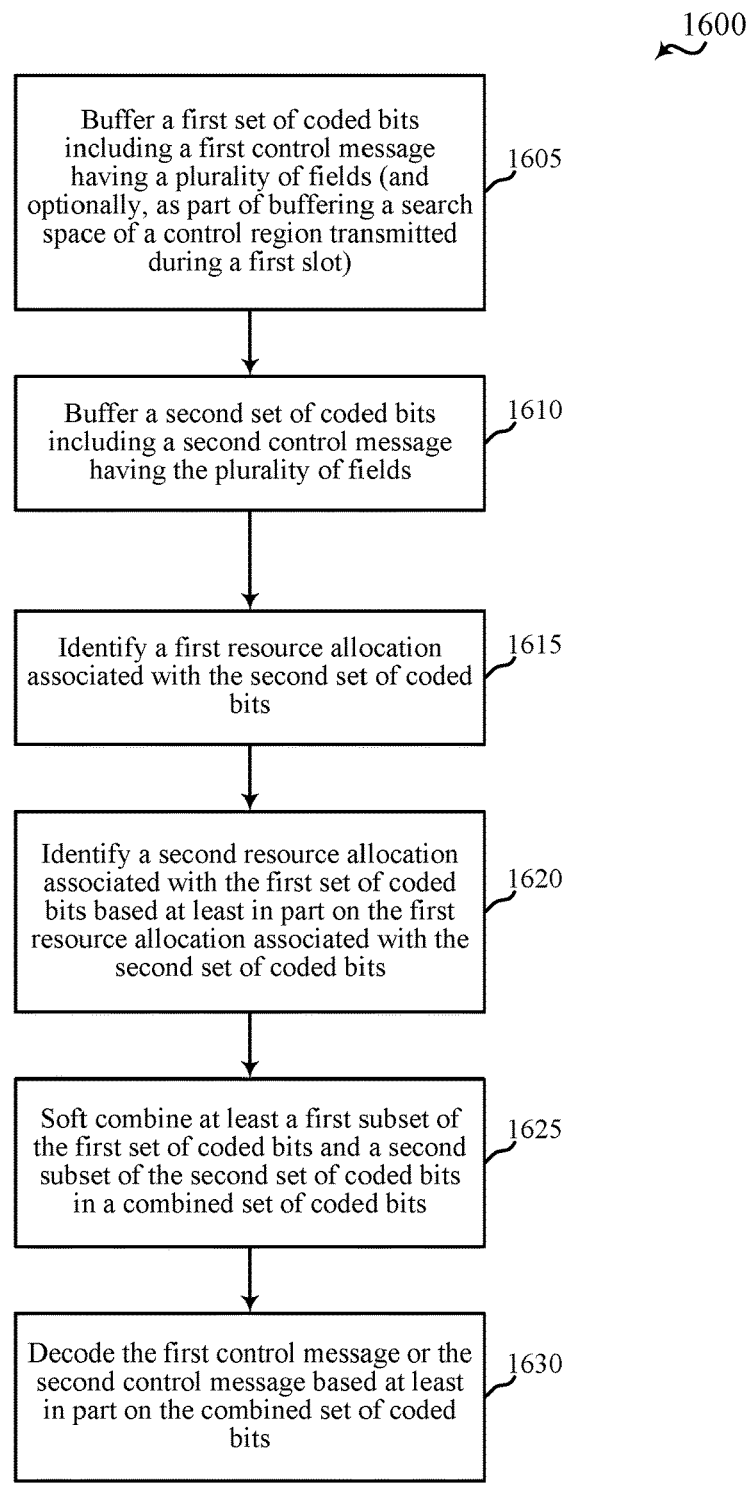
FIG. 16 is a flow chart illustrating an example of a method for wireless communication at a receiving device, in accordance with one or more aspects of the present disclosure.

FIG. 16 is a flow chart illustrating an example of a method 1600 for wireless communication at a receiving device, in accordance with one or more aspects of the present disclosure. For clarity, the method 1600 is described below with reference to aspects of a UE 115 described with reference to FIG. 1 or 11, aspects of the apparatus 715 or 815 described with reference to FIG. 7 or 8, or aspects of the wireless communication manager 720 described with reference to FIG. 1, 7, 8, 9, or 11. In some examples, a receiving device may execute one or more sets of codes to control the functional elements of the receiving device to perform the functions described below. Additionally or alternatively, the receiving device may perform one or more of the functions described below using special-purpose hardware.

At block 1605, the method 1600 may include buffering a first set of coded bits including a first control message. The first control message may also have a plurality of fields. The fields may include, for example, one or more fields having bits that are unchanged from the first control message to a second control message, one or more fields having bits that change deterministically from the first control message to a second control message, one or more fields having bits that change non-deterministically from the first control message to a second control message, or at least one field including a number of CRC bits. In some examples, the operation(s) at block 1605 may include buffering a search space of a control region transmitted during a first slot, and the buffering of the search space may include the buffering of the first set of coded bits. In some examples, the operation(s) may include buffering a search space of a control region transmitted during a first TTI, and the buffering of the search space may include the buffering of the first set of coded bits.

The operation(s) at block 1605 may be performed using the wireless communication manager 720 described with reference to FIG. 1, 7, 8, 9, or 11, or the transmission reception manager 835 described with reference to FIG. 8 or 9.

At block 1610, the method 1600 may include buffering a second set of coded bits including a second control message. The second control message may be a retransmission (or partial retransmission) of the first control message. The operation(s) at block 1610 may be performed using the wireless communication manager 720 described with reference to FIG. 1, 7, 8, 9, or 11, or the transmission reception manager 835 described with reference to FIG. 8 or 9.

At block 1615, the method 1600 may include identifying a first resource allocation associated with the second set of coded bits. In some examples, the first resource allocation may be identified before or during the operation(s) at block 1610. The operation(s) at block 1615 may be performed using the wireless communication manager 720 described with reference to FIG. 1, 7, 8, 9, or 11, or the resource allocation identifier 925 described with reference to FIG. 9.

At block 1620, the method 1600 may include identifying a second resource allocation associated with the first set of coded bits. The second resource allocation may be identified based at least in part on the first resource allocation associated with the second set of coded bits. Identification of the second resource allocation may enable identification of the first control message within the buffered search space. The operation(s) at block 1620 may be performed using the wireless communication manager 720 described with reference to FIG. 1, 7, 8, 9, or 11, or the resource allocation identifier 925 described with reference to FIG. 9.

At block 1625, the method 1600 may include soft combining at least a first subset of the first set of coded bits and a second subset of the second set of coded bits in a combined set of coded bits. The operation(s) at block 1635 may be performed using the wireless communication manager 720 described with reference to FIG. 1, 7, 8, 9, or 11, or the transmission soft combiner 840 described with reference to FIG. 8 or 9.

At block 1630, the method 1600 may include decoding the first control message or the second control message based at least in part on the combined set of coded bits. The operation(s) at block 1640 may be performed using the wireless communication manager 720 described with reference to FIG. 1, 7, 8, 9, or 11, or the decoder 845 described with reference to FIG. 8 or 9.

In some examples, the first set of coded bits may correspond to a first set of LLRs calculated for a first control transmission, and the second set of coded bits may correspond to a second set of LLRs calculated for a second control transmission. In some examples, each of the first set of coded bits and the second set of coded bits may be encoded based at least in part on a convolutional coding of information bits or a polar coding of information bits.

Figure 17:
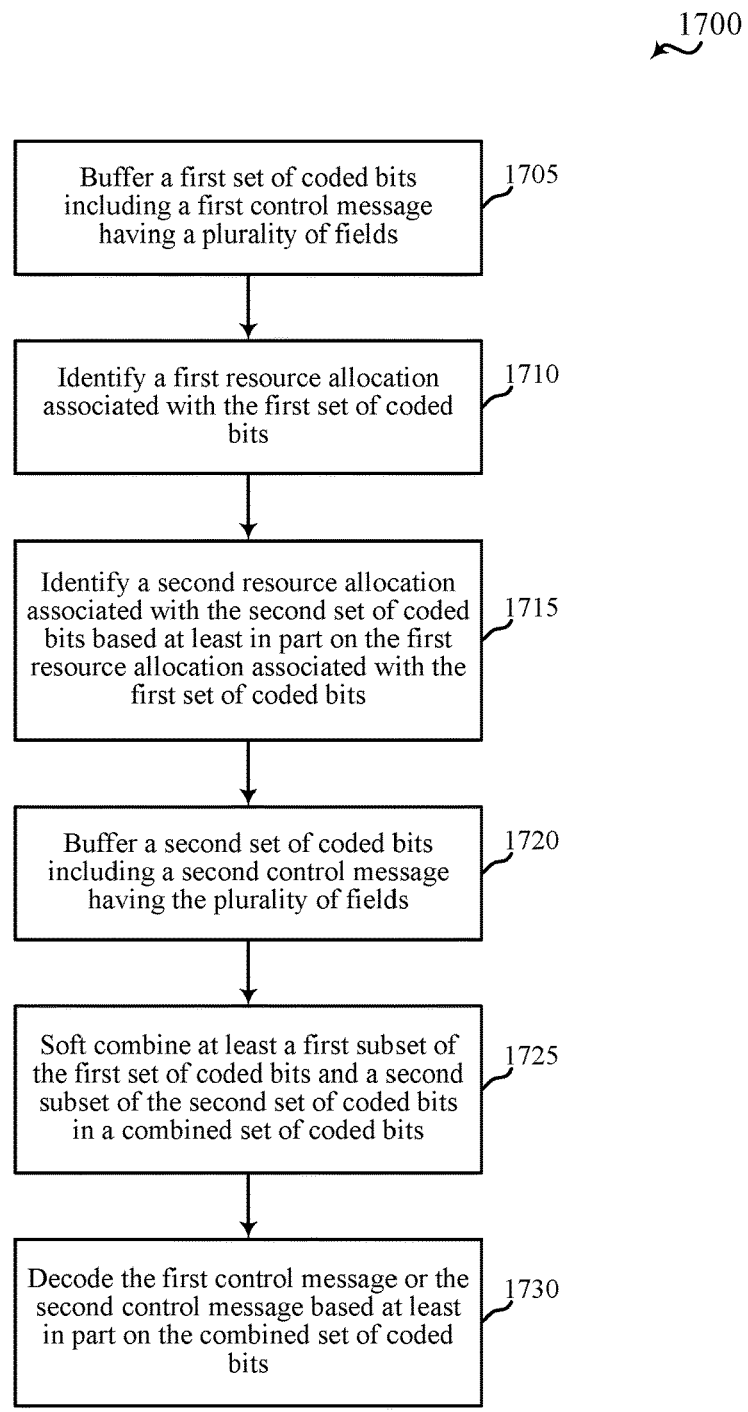
FIG. 17 is a flow chart illustrating an example of a method for wireless communication at a receiving device, in accordance with one or more aspects of the present disclosure.

FIG. 17 is a flow chart illustrating an example of a method 1700 for wireless communication at a receiving device, in accordance with one or more aspects of the present disclosure. For clarity, the method 1700 is described below with reference to aspects of a UE 115 described with reference to FIG. 1 or 11, aspects of the apparatus 715 or 815 described with reference to FIG. 7 or 8, or aspects of the wireless communication manager 720 described with reference to FIG. 1, 7, 8, 9, or 11. In some examples, a receiving device may execute one or more sets of codes to control the functional elements of the receiving device to perform the functions described below. Additionally or alternatively, the receiving device may perform one or more of the functions described below using special-purpose hardware.

At block 1705, the method 1700 may include buffering a first set of coded bits including a first control message. The first control message may have a plurality of fields. The fields may include, for example, one or more fields having bits that are unchanged from the first control message to a second control message, one or more fields having bits that change deterministically from the first control message to a second control message, one or more fields having bits that change non-deterministically from the first control message to a second control message, or at least one field including a number of CRC bits. The operation(s) at block 1705 may be performed using the wireless communication manager 720 described with reference to FIG. 1, 7, 8, 9, or 11, or the transmission reception manager 835 described with reference to FIG. 8 or 9.

At block 1710, the method 1700 may include identifying a first resource allocation associated with the first set of coded bits. The operation(s) at block 1710 may be performed using the wireless communication manager 720 described with reference to FIG. 1, 7, 8, 9, or 11, or the resource allocation identifier 925 described with reference to FIG. 9.

At block 1715, the method 1700 may include identifying a second resource allocation associated with a second set of coded bits based at least in part on the first resource allocation associated with the first set of coded bits. The operation(s) at block 1715 may be performed using the wireless communication manager 720 described with reference to FIG. 1, 7, 8, 9, or 11, or the resource allocation identifier 925 described with reference to FIG. 9.

At block 1720, the method 1700 may include buffering the second set of coded bits including the second control message. The second control message may also have the plurality of fields. The second control message may be a retransmission (or partial retransmission) of the first control message. The location of the second control message, within a search space of a control region, may be identified based at least in part on the second resource allocation identified at block 1715. In some examples, the operation(s) at block 1710 may include buffering a search space of a control region transmitted during a second slot, and the buffering of the search space may include the buffering of the second set of coded bits. Alternatively, the operation(s) may include buffering a search space of a control region transmitted during a second TTI, and the buffering of the search space may include the buffering the second set of coded bits.

The operation(s) at block 1720 may be performed using the wireless communication manager 720 described with reference to FIG. 1, 7, 8, 9, or 11, or the transmission reception manager 835 described with reference to FIG. 8 or 9.

At block 1725, the method 1700 may include soft combining at least a first subset of the first set of coded bits and a second subset of the second set of coded bits in a combined set of coded bits. The operation(s) at block 1725 may be performed using the wireless communication manager 720 described with reference to FIG. 1, 7, 8, 9, or 11, or the transmission soft combiner 840 described with reference to FIG. 8 or 9.

At block 1730, the method 1700 may include decoding the first control message or the second control message based at least in part on the combined set of coded bits. The operation(s) at block 1730 may be performed using the wireless communication manager 720 described with reference to FIG. 1, 7, 8, 9, or 11, or the decoder 845 described with reference to FIG. 8 or 9.

In some examples, the first set of coded bits may correspond to a first set of LLRs calculated for a first control transmission, and the second set of coded bits may correspond to a second set of LLRs calculated for a second control transmission. In some examples, each of the first set of coded bits and the second set of coded bits may be encoded based at least in part on a convolutional coding of information bits or a polar coding of information bits.

Figure 18:
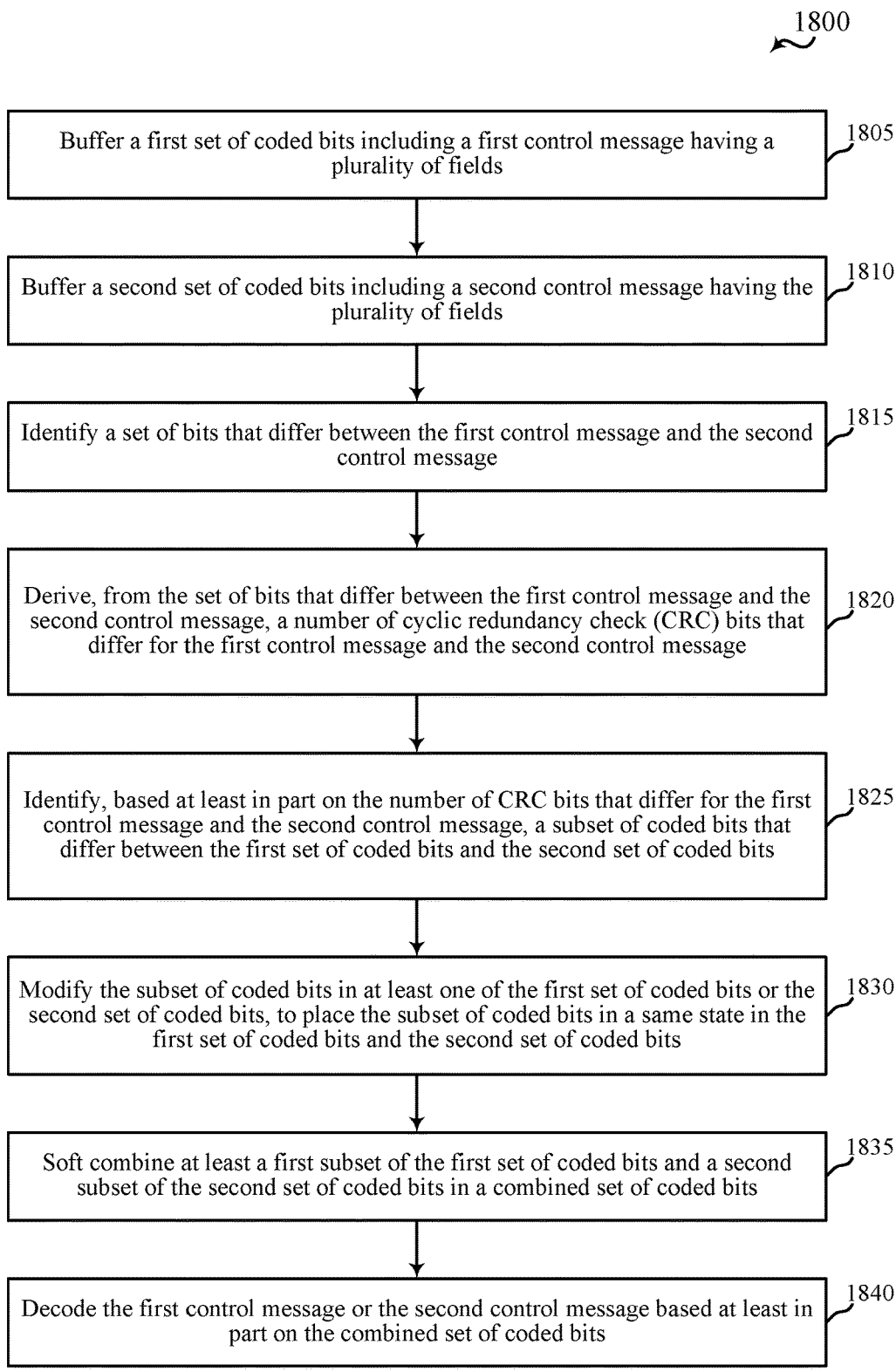
FIG. 18 is a flow chart illustrating an example of a method for wireless communication at a receiving device, in accordance with one or more aspects of the present disclosure.

FIG. 18 is a flow chart illustrating an example of a method 1800 for wireless communication at a receiving device, in accordance with one or more aspects of the present disclosure. For clarity, the method 1800 is described below with reference to aspects of a UE 115 described with reference to FIG. 1 or 11, aspects of the apparatus 715 or 815 described with reference to FIG. 7 or 8, or aspects of the wireless communication manager 720 described with reference to FIG. 1, 7, 8, 9, or 11. In some examples, a receiving device may execute one or more sets of codes to control the functional elements of the receiving device to perform the functions described below. Additionally or alternatively, the receiving device may perform one or more of the functions described below using special-purpose hardware.

At block 1805, the method 1800 may include buffering a first set of coded bits including a first control message. The first control message may have a plurality of fields. The fields may include, for example, one or more fields having bits that are unchanged from the first control message to a second control message, one or more fields having bits that change deterministically from the first control message to a second control message, one or more fields having bits that change non-deterministically from the first control message to a second control message, or at least one field including a number of CRC bits. The operation(s) at block 1805 may be performed using the wireless communication manager 720 described with reference to FIG. 1, 7, 8, 9, or 11, or the transmission reception manager 835 described with reference to FIG. 8 or 9.

At block 1810, the method 1800 may include buffering a second set of coded bits including a second control message. The second control message may also have the plurality of fields. The second control message may be a retransmission (or partial retransmission) of the first control message. The operation(s) at block 1810 may be performed using the wireless communication manager 720 described with reference to FIG. 1, 7, 8, 9, or 11, or the transmission reception manager 835 described with reference to FIG. 8 or 9.

At block 1815, the method 1800 may include identifying a set of bits that differ between the first control message and the second control message. The operation(s) at block 1815 may be performed using the wireless communication manager 720 described with reference to FIG. 1, 7, 8, 9, or 11, or the CRC processor 940 described with reference to FIG. 9.

At block 1820, the method 1800 may include deriving, from the set of bits that differ between the first control message and the second control message, a number of CRC bits that differ for the first control message and the second control message. The operation(s) at block 1820 may be performed using the wireless communication manager 720 described with reference to FIG. 1, 7, 8, 9, or 11, or the CRC processor 940 described with reference to FIG. 9.

At block 1825, the method 1800 may include identifying, based at least in part on the number of CRC bits that differ for the first control message and the second control message, a subset of coded bits that differ between the first set of coded bits and the second set of coded bits. The operation(s) at block 1825 may be performed using the wireless communication manager 720 described with reference to FIG. 1, 7, 8, 9, or 11, or the CRC processor 940 described with reference to FIG. 9.

At block 1830, the method 1800 may include modifying the subset of coded bits in at least one of the first set of coded bits or the second set of coded bits, to place the subset of coded bits in a same state in the first set of coded bits and the second set of coded bits. The operation(s) at block 1830 may be performed using the wireless communication manager 720 described with reference to FIG. 1, 7, 8, 9, or 11, or the CRC processor 940 described with reference to FIG. 9.

At block 1835, the method 1800 may include soft combining at least a first subset of the first set of coded bits and a second subset of the second set of coded bits in a combined set of coded bits. The operation(s) at block 1835 may be performed using the wireless communication manager 720 described with reference to FIG. 1, 7, 8, 9, or 11, or the transmission soft combiner 840 described with reference to FIG. 8 or 9.

At block 1840, the method 1800 may include decoding the first control message or the second control message based at least in part on the combined set of coded bits. The operation(s) at block 1840 may be performed using the wireless communication manager 720 described with reference to FIG. 1, 7, 8, 9, or 11, or the decoder 845 described with reference to FIG. 8 or 9.

In some examples, the first set of coded bits may correspond to a first set of LLRs calculated for a first control transmission, and the second set of coded bits may correspond to a second set of LLRs calculated for a second control transmission. In some examples, each of the first set of coded bits and the second set of coded bits may be encoded based at least in part on a convolutional coding of information bits or a polar coding of information bits.

The methods 1300, 1400, 1500, 1600, 1700, and 1800 described with reference to FIGS. 13, 14, 15, 16, 17, and 18 may provide for wireless communication. It should be noted that the methods 1300, 1400, 1500, 1600, 1700, and 1800 are just example implementations, and the operations of the methods 1300, 1400, 1500, 1600, 1700, and 1800 may be rearranged or otherwise modified such that other implementations are possible. In some examples, operations of the methods 1300, 1400, 1500, 1600, 1700, and/or 1800 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication at a receiving device, comprising:
    buffering a first set of coded bits including a first control message having a plurality of fields;
    buffering a second set of coded bits including a second control message having the plurality of fields;
    generating sequential ranks of the first set of coded bits and the second set of coded bits, wherein each rank of coded bits is generated based on a different subset of information bits in the first control message or the second control message, and wherein each lower rank of coded bits is generated based on a subset of the information bits used to generate a next higher rank of coded bits;
soft combining at least a first subset of the first set of coded bits and a second subset of the second set of coded bits in a combined set of coded bits, wherein the soft combining is performed for the sequential ranks beginning with a lowest rank; and
decoding the first control message or the second control message based at least in part on the combined set of coded bits.

2. The method of claim 1, further comprising:
refraining from soft combining a subset of the sequential ranks including at least one sequentially highest rank.

3. The method of claim 2, further comprising:
identifying, within the plurality of fields, at least one field having a set of bits that change non-deterministically from the first control message to the second control message,
wherein the refraining is based at least in part on the identifying.

4. The method of claim 2, further comprising:
identifying, within the plurality of fields, at least one field having a set of bits that change deterministically from the first control message to the second control message;
deriving, from the set of bits that change deterministically from the first control message to the second control message, a subset of coded bits that differ between the first set of coded bits and the second set of coded bits; and
modifying the subset of coded bits in at least one of the first set of coded bits or the second set of coded bits to place the subset of coded bits in a same state in the first set of coded bits and the second set of coded bits.

5. The method of claim 1, further comprising:
buffering a search space of a control region transmitted during a first slot, wherein buffering the search space comprises buffering the first set of coded bits.

6. The method of claim 5, further comprising:
identifying a first resource allocation associated with the second set of coded bits; and
identifying a second resource allocation associated with the first set of coded bits based at least in part on the first resource allocation associated with the second set of coded bits.

7. The method of claim 1, further comprising:
identifying a first resource allocation associated with the first set of coded bits; and
identifying a second resource allocation associated with the second set of coded bits based at least in part on the first resource allocation associated with the first set of coded bits.

8. The method of claim 7, wherein the soft combining is based at least in part on identifying the first resource allocation, identifying the second resource allocation, or both.

9. The method of claim 1, wherein the first set of coded bits and the second set of coded bits are encoded based at least in part on one or more of a convolutional coding of information bits and a polar coding of information bits.

10. A method of wireless communication at a receiving device, comprising:
buffering a first set of coded bits including a first control message having a plurality of fields;
buffering a second set of coded bits including a second control message having the plurality of fields;
identifying a set of bits that differ between the first control message and the second control message;
deriving, from the set of bits that differ between the first control message and the second control message, a number of cyclic redundancy check (CRC) bits that differ for the first control message and the second control message;
identifying, based at least in part on the number of CRC bits that differ for the first control message and the second control message, a subset of coded bits that differ between the first set of coded bits and the second set of coded bits;
modifying the subset of coded bits in at least one of the first set of coded bits or the second set of coded bits, to place the subset of coded bits in a same state in the first set of coded bits and the second set of coded bits;
soft combining at least a first subset of the first set of coded bits and a second subset of the second set of coded bits in a combined set of coded bits; and
decoding the first control message or the second control message based at least in part on the combined set of coded bits.

11. A method of wireless communication at a receiving device, comprising:
buffering a first set of coded bits including a first control message having a plurality of fields;
buffering a second set of coded bits including a second control message having the plurality of fields;
identifying, within the plurality of fields, at least one field having a set of bits that change deterministically from the first control message to the second control message;
deriving, from the set of bits that change deterministically from the first control message to the second control message, a subset of coded bits that differ between the first set of coded bits and the second set of coded bits;
modifying the subset of coded bits in at least one of the first set of coded bits or the second set of coded bits, to place the subset of coded bits in a same state in the first set of coded bits and the second set of coded bits
soft combining at least a first subset of the first set of coded bits and a second subset of the second set of coded bits in a combined set of coded bits; and
decoding the first control message or the second control message based at least in part on the combined set of coded bits.

12. An apparatus for wireless communication, comprising:
a processor;
memory in electronic communication with the processor; and
the processor and memory configured to:
buffer a first set of coded bits including a first control message having a plurality of fields;
buffer a second set of coded bits including a second control message having the plurality of fields;
generate sequential ranks of the first set of coded bits and the second set of coded bits, wherein each rank of coded bits is generated based on a different subset of information bits in the first control message or the second control message, and wherein each lower rank of coded bits is generated based on a subset of the information bits used to generate a next higher rank of coded bits;
soft combine at least a first subset of the first set of coded bits and a second subset of the second set of coded bits in a combined set of coded bits, wherein the soft combining is performed for the sequential ranks beginning with a lowest rank; and decode the first control message or the second control message based at least in part on the combined set of coded bits.

13. The apparatus of claim 12, wherein the processor and memory are configured to:

refrain from soft combining a subset of the sequential ranks including at least one sequentially highest rank.

14. The apparatus of claim 13, wherein the processor and memory are configured to:

identify, within the plurality of fields, at least one field having a set of bits that change non-deterministically from the first control message to the second control message, wherein the refraining is based at least in part on the identifying.

15. The apparatus of claim 13, wherein the processor and memory are configured to:

identify, within the plurality of fields, at least one field having a set of bits that change deterministically from the first control message to the second control message;

derive, from the set of bits that change deterministically from the first control message to the second control message, a subset of coded bits that differ between the first set of coded bits and the second set of coded bits; and modify the subset of coded bits in at least one of the first set of coded bits or the second set of coded bits to place the subset of coded bits in a same state in the first set of coded bits and the second set of coded bits.

16. The apparatus of claim 12, wherein the processor and memory are configured to:

buffer a search space of a control region transmitted during a first slot, wherein buffering the search space comprises buffering the first set of coded bits.

17. The apparatus of claim 16, wherein the processor and memory are configured to:

identify a first resource allocation associated with the second set of coded bits; and identify a second resource allocation associated with the first set of coded bits based at least in part on the first resource allocation associated with the second set of coded bits.

18. The apparatus of claim 12, wherein the processor and memory are configured to:

identify a first resource allocation associated with the first set of coded bits; and identify a second resource allocation associated with the second set of coded bits based at least in part on the first resource allocation associated with the first set of coded bits.

19. The apparatus of claim 18, wherein the soft combining is based at least in part on identifying the first resource allocation, identifying the second resource allocation, or both.

20. The apparatus of claim 12, wherein the first set of coded bits and the second set of coded bits are encoded based at least in part on one or more of a convolutional coding of information bits and a polar coding of information bits.

21. An apparatus for wireless communication, comprising:

a processor;

memory in electronic communication with the processor; and the processor and memory configured to:

buffer a first set of coded bits including a first control message having a plurality of fields;

buffer a second set of coded bits including a second control message having the plurality of fields;

identify a set of bits that differ between the first control message and the second control message;

derive, from the set of bits that differ between the first control message and the second control message, a number of cyclic redundancy check (CRC) bits that differ for the first control message and the second control message;

identify, based at least in part on the number of CRC bits that differ for the first control message and the second control message, a subset of coded bits that differ between the first set of coded bits and the second set of coded bits;

modify the subset of coded bits in at least one of the first set of coded bits or the second set of coded bits, to place the subset of coded bits in a same state in the first set of coded bits and the second set of coded bits;

soft combine at least a first subset of the first set of coded bits and a second subset of the second set of coded bits in a combined set of coded bits; and decode the first control message or the second control message based at least in part on the combined set of coded bits.

22. An apparatus for wireless communication, comprising:

a processor;

memory in electronic communication with the processor; and the processor and memory configured to:

buffer a first set of coded bits including a first control message having a plurality of fields;

buffer a second set of coded bits including a second control message having the plurality of fields;

identify, within the plurality of fields, at least one field having a set of bits that change deterministically from the first control message to the second control message;

derive, from the set of bits that change deterministically from the first control message to the second control message, a subset of coded bits that differ between the first set of coded bits and the second set of coded bits; and modify the subset of coded bits in at least one of the first set of coded bits or the second set of coded bits, to place the subset of coded bits in a same state in the first set of coded bits and the second set of coded bits;

soft combine at least a first subset of the first set of coded bits and a second subset of the second set of coded bits in a combined set of coded bits; and decode the first control message or the second control message based at least in part on the combined set of coded bits.

23. A non-transitory computer-readable medium storing computer-executable code, the code executable by a processor to cause an apparatus to:

buffer a first set of coded bits including a first control message having a plurality of fields;

buffer a second set of coded bits including a second control message having the plurality of fields;

generate sequential ranks of the first set of coded bits and the second set of coded bits, wherein each rank of coded bits is generated based on a different subset of information bits in the first control message or the second control message, and wherein each lower rank of coded bits is generated based on a subset of the information bits used to generate a next higher rank of coded bits;

soft combine at least a first subset of the first set of coded bits and a second subset of the second set of coded bits in a combined set of coded bits, wherein the soft combining is performed for the sequential ranks beginning with a lowest rank; and decode the first control message or the second control message based at least in part on the combined set of coded bits.

24. The non-transitory computer-readable medium of claim 23, wherein the code is further executable by the processor to cause the apparatus to:

refraining from soft combining a subset of the sequential ranks including at least one sequentially highest rank.

25. An apparatus comprising:

means for buffering a first set of coded bits including a first control message having a plurality of fields;

means for buffering a second set of coded bits including a second control message having the plurality of fields;

means for generating sequential ranks of the first set of coded bits and the second set of coded bits, wherein each rank of coded bits is generated based on a different subset of information bits in the first control message or the second control message, and wherein each lower rank of coded bits is generated based on a subset of the information bits used to generate a next higher rank of coded bits;

means for soft combining at least a first subset of the first set of coded bits and a second subset of the second set of coded bits in a combined set of coded bits, wherein the soft combining is performed for the sequential ranks beginning with a lowest rank; and means for decoding the first control message or the second control message based at least in part on the combined set of coded bits.

26. The apparatus of claim 25, further comprising:

means for identifying a first resource allocation associated with the first set of coded bits; and means for identifying a second resource allocation associated with the second set of coded bits based at least in part on the first resource allocation associated with the first set of coded bits.

* * * * *